US008854653B2

(12) United States Patent
Tomita

(10) Patent No.: US 8,854,653 B2
(45) Date of Patent: Oct. 7, 2014

(54) PULL PRINT SUPPORTING IMAGE FORMING SYSTEM, SERVER, COMPUTER READABLE MEDIUM STORING IMAGE FORMING PROGRAM AND IMAGE FORMING METHOD

(75) Inventor: Atsushi Tomita, Toyohashi (JP)

(73) Assignee: Konica Minolta Business Technologies, Inc., Chiyoda-ku, Tokyo (JP)

( * ) Notice: Subject to any disclaimer, the term of this patent is extended or adjusted under 35 U.S.C. 154(b) by 1377 days.

(21) Appl. No.: 12/029,237

(22) Filed: Feb. 11, 2008

(65) Prior Publication Data

US 2009/0059275 A1 Mar. 5, 2009

(30) Foreign Application Priority Data

Aug. 28, 2007 (JP) ................................ 2007-221153

(51) Int. Cl.
*G06F 3/12* (2006.01)
(52) U.S. Cl.
CPC ............ *G06F 3/1288* (2013.01); *G06F 3/1214* (2013.01); *G06F 3/1245* (2013.01)
USPC ........................................ 358/1.15; 358/1.13
(58) Field of Classification Search
USPC ........................................ 358/1.9, 1.13–1.18
See application file for complete search history.

(56) References Cited

U.S. PATENT DOCUMENTS

| 6,623,190 | B1 * | 9/2003 | Lutz ................................ 400/76 |
| 7,180,614 | B1 * | 2/2007 | Senoo et al. .................. 358/1.15 |
| 7,809,807 | B2 * | 10/2010 | Tominaga ...................... 709/220 |
| 2001/0029551 | A1 * | 10/2001 | Higuchi ........................ 709/321 |
| 2003/0011814 | A1 * | 1/2003 | Nunokawa et al. .......... 358/1.15 |
| 2003/0033368 | A1 | 2/2003 | Tominaga |
| 2003/0226464 | A1 * | 12/2003 | Mathieson ..................... 101/484 |
| 2005/0068564 | A1 * | 3/2005 | Ferlitsch ....................... 358/1.15 |
| 2005/0076298 | A1 * | 4/2005 | Lutz .............................. 715/527 |
| 2006/0012835 | A1 * | 1/2006 | Shimizu ........................ 358/449 |

(Continued)

FOREIGN PATENT DOCUMENTS

| JP | 10-124356 | 5/1998 |
| JP | 10-254662 A | 9/1998 |

(Continued)

OTHER PUBLICATIONS

Office Action from Japanese Patent Office issued in related Japanese Patent Application No. 2007-221152 dated Jun. 23, 2009, and an English translation thereof.

(Continued)

*Primary Examiner* — Houshang Safaipour
*Assistant Examiner* — Walter Yehl
(74) *Attorney, Agent, or Firm* — Buchanan Ingersoll & Rooney PC

(57) ABSTRACT

A server includes a data converting unit, a converted data storage unit, and a converted data transmitting unit. The data converting unit converts, based on device information of each image forming apparatus, print data to converted data allowing image formation by each image forming apparatus, for each image forming apparatus. The converted data storage unit stores the converted data in correspondence with information specifying the corresponding image forming apparatus. The converted data transmitting unit transmits, in response to data request from the image forming apparatus, the converted data corresponding to the image forming apparatus stored in the converted data storage unit, to the image forming apparatus.

14 Claims, 19 Drawing Sheets

(56) References Cited

U.S. PATENT DOCUMENTS

| | | | |
|---|---|---|---|
| 2006/0126089 A1* | 6/2006 | Sedky et al. | 358/1.13 |
| 2006/0164677 A1 | 7/2006 | Ahn | |
| 2006/0224939 A1 | 10/2006 | Namikata | |
| 2008/0309961 A1 | 12/2008 | Aichi et al. | |
| 2009/0059273 A1 | 3/2009 | Tomita | |
| 2009/0059274 A1 | 3/2009 | Tomita | |
| 2011/0255110 A1* | 10/2011 | d'Entrecasteaux | 358/1.13 |

FOREIGN PATENT DOCUMENTS

| | | |
|---|---|---|
| JP | 11-234436 | 8/1999 |
| JP | 2000-112687 A | 4/2000 |
| JP | 2001-216242 | 8/2001 |
| JP | 2001-249781 | 9/2001 |
| JP | 2002-049476 | 2/2002 |
| JP | 2002-132464 A | 5/2002 |
| JP | 2003-046761 A | 2/2003 |
| JP | 2003-050689 | 2/2003 |
| JP | 2004-072247 | 3/2004 |
| JP | 2004-074473 | 3/2004 |
| JP | 2004-193639 A | 7/2004 |
| JP | 2004-220354 A | 8/2004 |
| JP | 2004-234326 | 8/2004 |
| JP | 2004-287763 | 10/2004 |
| JP | 2005-056294 | 3/2005 |
| JP | 2005-173658 | 6/2005 |
| JP | 2006-031465 | 2/2006 |
| JP | 2006-067368 A | 3/2006 |
| JP | 2006-092373 | 4/2006 |
| JP | 2006-099714 | 4/2006 |
| JP | 2006-133877 | 5/2006 |
| JP | 2006-197158 | 7/2006 |
| JP | 2006-252300 A | 9/2006 |
| JP | 2006-287745 | 10/2006 |
| JP | 2006-350497 | 12/2006 |
| JP | 2007-030354 | 2/2007 |

OTHER PUBLICATIONS

Office Action from Japanese Patent Office issued in related Japanese Patent Application No. 2007-221151 dated Jun. 23, 2009, and an English translation thereof.

Office Action from Japanese Patent Office issued in corresponding Japanese Patent Application No. 2009-172022 dated Dec. 21, 2010, and an English translation thereof.

Decision of Grant Patent in JP 2007-221153 dated Jun. 23, 2009, and an English Translation thereof.

Official Action dated Apr. 20, 2011, issued by the U.S. Patent and Trademark Office in related U.S. Appl. No. 12/029,167.

Official Action dated Apr. 20, 2011, issued by the U.S. Patent and Trademark Office in related U.S. Appl. No. 12/029,188.

Decision to Grant and English-language translation, mailed Apr. 19, 2011 in Corresponding JP Appln No. 2009-172022, 6 pages.

* cited by examiner

| JOB ID | DOCUMENT |
|---|---|
| 132 | DOCUMENT1.doc |
| 133 | DOCUMENT2.doc |
| 134 | DOCUMENT3.doc |
| 135 | DOCUMENT4.doc |
| 136 | DOCUMENT5.doc |
| : | : |
| | |

| IMAGE FORMING APPARATUS | IP ADDRESS | TYPE |
|---|---|---|
| MFP1 | 192.168.10.1 | TYPE a |
| MFP2 | 192.168.10.2 | TYPE b |
| MFP3 | 192.168.10.3 | TYPE b |
| MFP4 | 192.168.10.4 | TYPE a |
| MFP5 | 192.168.10.5 | TYPE c |
| : | : | : |
| | | |

| FUNCTION | MFP1 | MFP2 | MFP3 | ~ | MFPn |
|---|---|---|---|---|---|
| DOUBLE SIDED PRINT | Y | Y | N | | Y |
| Nin1 PRINT | Y | Y | N | | Y |
| SORT OUTPUT | Y | Y | N | | Y |
| GROUP OUTPUT | Y | Y | Y | | Y |
| FACE UP OUTPUT | Y | Y | N | | Y |
| STAPLE | N | Y | N | | N |
| PUNCH | N | Y | N | | N |

FIG.13

| JOB ID | IMAGE FORMING APPARATUS | CONVERTED DATA |
|---|---|---|
| 132 | MFP1 | Data132-1.prn |
| 132 | MFP2 | Data132-2.prn |
| 132 | MFP3 | Data132-2.prn |
| 133 | MFP1 | Data133-1.prn |
| 133 | MFP2 | Data133-2.prn |
| : | : | : |
|  |  |  |

FIG.15A

```
%-12345X@PJL
    @PJL SET RESOLUTION = 600        ─ 331
    @PJL SET QTY = 1                 ─ 332
    @PJL SET SORT = ON               ─ 333
    @PJL SET DUPLEX = ON             ─ 334
    @PJL SET BINDING = LEFT          ─ 335
    @PJL SET NIN1 = 2IN1             ─ 336
    @PJL SET FINISH = NONE           ─ 337
    @PJL SET PUNCH = OFF             ─ 338
    @PJL SET ENTER LANGUAGE = PCL    ─ 339
    {PDL DATA OF PAGE 1}
    {PDL DATA OF PAGE 2}
         .
         .
    {PDL DATA OF PAGE 10}
%-12345X
```

330 brackets lines 331–339; 332 points to {PDL DATA OF PAGE 1}

FIG.15B

```
%-12345X@PJL
    @PJL SET RESOLUTION = 600        ─ 331
    @PJL SET QTY = 1                 ─ 332
    @PJL SET SORT = ON               ─ 333
    @PJL SET DUPLEX = ON             ─ 334
    @PJL SET BINDING = LEFT          ─ 335
    @PJL SET NIN1 = 2IN1             ─ 336
    @PJL SET FINISH = NONE           ─ 337
    @PJL SET PUNCH = OFF             ─ 338
    @PJL SET ENTER LANGUAGE = PCL    ─ 339
    {PDL DATA OF PAGE 10}
    {PDL DATA OF PAGE 9}
         .
         .
    {PDL DATA OF PAGE 2}
    {PDL DATA OF PAGE 1}
%-12345X
```

330 brackets lines 331–339; 332 points to {PDL DATA OF PAGE 10}

FIG.16A

```
%-12345X@PJL
@PJL SET RESOLUTION = 600     ─── 331
@PJL SET QTY = 2              ─── 332
@PJL SET SORT = ON            ─── 333
@PJL SET DUPLEX = ON          ─── 334
@PJL SET BINDING = LEFT       ─── 335
@PJL SET NIN1 = 2IN1          ─── 336
@PJL SET FINISH = NONE        ─── 337
@PJL SET PUNCH = OFF          ─── 338
@PJL SET ENTER LANGUAGE = PCL ─── 339
{PDL DATA OF PAGE 1}
{PDL DATA OF PAGE 2}
{PDL DATA OF PAGE 3}
%-12345X
```

330 { (lines 331–339)
332 → {PDL DATA OF PAGE 1}

FIG.16B

```
%-12345X@PJL
@PJL SET RESOLUTION = 600     ─── 331
@PJL SET QTY = 1              ─── 332
@PJL SET DUPLEX = ON          ─── 334
@PJL SET BINDING = LEFT       ─── 335
@PJL SET NIN1 = 2IN1          ─── 336
@PJL SET FINISH = NONE        ─── 337
@PJL SET PUNCH = OFF          ─── 338
@PJL SET ENTER LANGUAGE = PCL ─── 339
{PDL DATA OF PAGE 1}
{PDL DATA OF PAGE 2}
{PDL DATA OF PAGE 3}
{PDL DATA OF PAGE 1}
{PDL DATA OF PAGE 2}
{PDL DATA OF PAGE 3}
%-12345X
```

330 { (lines 331–339)
332 → {PDL DATA OF PAGE 2}

FIG.19
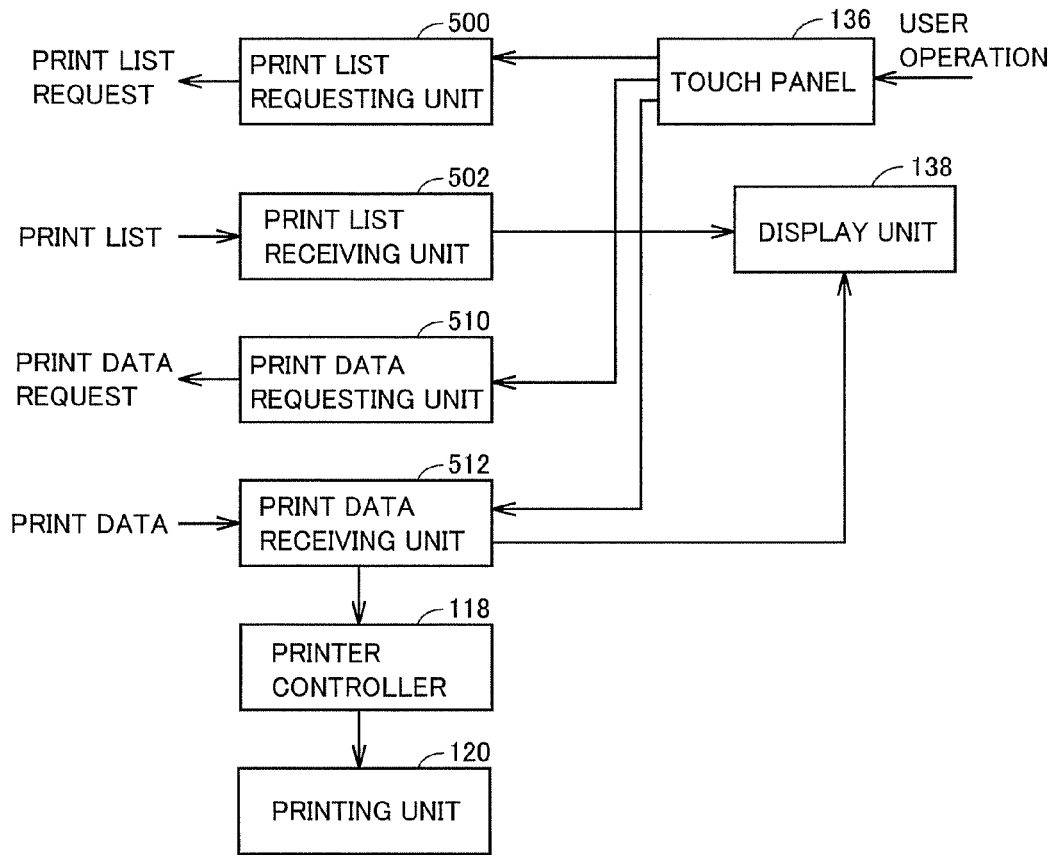
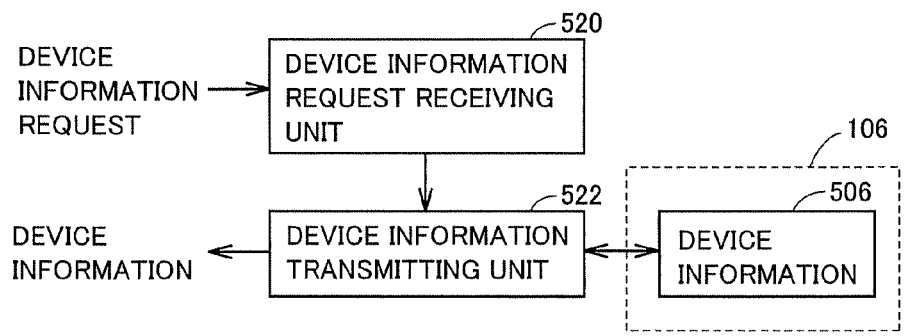

FIG.20

```
PRINT JOB LIST

PRINT JOB SELECTION:        558
  ┌────┬──────────────────┬─┐
  │ ID │ DOCUMENT         │△│
  ├────┼──────────────────┤ │
  │132 │ DOCUMENT 1.doc   │ │
  │133 │ DOCUMENT 2.doc   │ │
  │134 │ DOCUMENT 3.doc   │ │
  │135 │ DOCUMENT 4.doc   │ │
  │136 │ DOCUMENT 5.doc   │ │
  │137 │ DOCUMENT 6.doc   │ │
  │138 │ DOCUMENT 7.doc   │ │
  │139 │ DOCUMENT 8.doc   │▽│
  └────┴──────────────────┴─┘

[ OK ]   [ CANCEL ]
```

| FUNCTION | SUPPORTING STATE |
|---|---|
| DOUBLE SIDED PRINT | Y |
| Nin1 PRINT | Y |
| SORT OUTPUT | Y |
| GROUP OUTPUT | Y |
| FACE UP OUTPUT | Y |
| STAPLE | N |
| PUNCH | N |

PULL PRINT SUPPORTING IMAGE FORMING SYSTEM, SERVER, COMPUTER READABLE MEDIUM STORING IMAGE FORMING PROGRAM AND IMAGE FORMING METHOD

This application is based on Japanese Patent Application No. 2007-221153 filed with the Japan Patent Office on Aug. 28, 2007, the entire content of which is hereby incorporated by reference.

BACKGROUND OF THE INVENTION

1. Field of the Invention

The present invention relates to a so-called image forming system, a server, a computer readable medium storing an image forming program and an image forming method and, more specifically, to a technique for lessening machine dependency of print data.

2. Description of the Related Art

Conventionally, in a configuration for forming an image (typically, printing an image on paper medium) of a document or the like, generated by an information processing apparatus such as a personal computer, by an image forming apparatus such as a printer, the information processing apparatus and the image forming apparatus are connected to each other through a network and print data is directly transmitted from the information processing apparatus to the image forming apparatus. In such a configuration, the information processing apparatus and the image forming apparatus are connected in one-to-one correspondence.

As another approach, a so-called client-server type configuration is also available. In the client-server configuration, print data transmitted from a plurality of information processing apparatuses are once collected to a server, generally referred to as a print server. The print data (or print jobs) collected by the print server are transmitted to the image forming apparatus in a prescribed order. In this configuration, a plurality of information processing apparatuses share one image forming apparatus, by the server.

Recently, a scheme referred to as "pull print" or "ubiquitous print" has been proposed, which is an improvement over the client-server configuration. In the pull print supporting configuration, a server collects print data generated by any of the information processing apparatuses, and any of the image forming apparatuses selectively obtains print data collected in the server and forms an image of obtained print data. As an example of such pull print supporting configuration, Japanese Laid-Open Patent Publication No. 2004-220354 discloses a network printing system that allows a user to directly and plainly specify an output destination printer. The network printing system includes one or a plurality of client terminals, a print server and one or a plurality of printers, connected by a network.

Japanese Laid-Open Patent Publication No. 2000-112687 discloses a host apparatus in which types of data that can be output from a printer are stored, type of data to be output from the printer is recognized, whether the data of interest can be output from the printer or not is determined, and if output of the data is determined to be possible, a pull print instruction is issued so that the data to be output is directly passed to said printer to be output therefrom, whereas if output of data is determined to be impossible, data of the type that can be output is generated from the data of interest, and thereafter a print instruction is issued to have the data output from the printer.

Japanese Laid-Open Patent Publication No. 2006-252300 discloses a pull print system including pull print means, means for registering print data on a WEB server, means for automatically preparing a plurality of print data of different formats at the time of registration, and means for preparing an information header in which the print data, URL information and object printer model information are organized, wherein the pull print means acquires optimal print data from print data of various formats and performs printing.

In such a pull print supporting configuration, it is possible to form an image of an arbitrary print data by an arbitrary image forming apparatus. Therefore, when an image forming apparatus is busy with processing, the process can easily be performed by another image forming apparatus.

Image forming apparatuses of late allow installation of various and many functions, and by such functions, various print settings may be made when the print data is generated by the information processing apparatus. The print setting designated on the side of information processing apparatus is added as setting information to the print data and transmitted to the server.

On the other hand, among the plurality of image forming apparatuses, there may be one not supporting most of the above-described functions. Therefore, when print data, prepared on the assumption that various and many functions are available, were processed by an image forming apparatus having limited functions only, the resulting output would be unsatisfactory. If the output destination of the print data is limited to only the image forming apparatus or apparatuses fully equipped with the necessary functions, the advantage of pull print type configuration that the print data can be processed by any of the image processing apparatuses cannot fully be enjoyed.

Further, when setting information is interpreted by the image forming apparatus receiving the print data, even one same piece of setting information may be interpreted as different printing methods by each of image forming apparatus of different types.

SUMMARY OF THE INVENTION

The present invention was made to solve the above-described problems, and its object is to provide an image forming system, a server, a computer readable medium storing image forming program and an image forming method that enable, when an image of print data possibly including request dependent on a specific function is to be formed, image formation with the request fulfilled, regardless of difference in functions supported by, or difference in commands that can be interpreted in, the image forming apparatus.

According to an aspect, the present invention provides an image forming system, including: at least one information processing apparatus capable of transmitting print data including setting information related to image formation; a server receiving the print data from the information processing apparatus, and at least one image forming apparatus capable of data communication with the server. The server includes a device information storage unit storing in advance device information of each of the at least one image forming apparatus, a print data storage unit storing the print data from the information processing apparatus, a data converting unit converting the print data to converted data allowing image formation by each image forming apparatus, for each image forming apparatus based on the device information, a converted data storage unit storing the converted data in correspondence with information specifying the image forming apparatus, and a converted data transmitting unit responsive to a data request from the image forming apparatus for transmitting the converted data corresponding to the image forming apparatus, stored in the converted data storage unit. Each image forming apparatus includes a data requesting unit transmitting the data request to the server in accordance with a user operation, and a processing unit for performing an image forming process based on the converted data from the server.

According to this aspect, when the image forming apparatus forms an image of print data that possibly includes a request dependent on a specific function, the image can be formed with the request fulfilled, regardless of the difference in functions supported by the image forming apparatus or difference in command that can be interpreted by the apparatus.

Preferably, the server further includes a list generating unit generating a list of converted data corresponding to the image forming apparatus, for each image forming apparatus, based on the converted data stored in the converted data storage unit, and a list transmitting unit responsive to a list request from the image forming apparatus, for transmitting the list corresponding to the image forming apparatus to the image forming apparatus. The converted data transmitting unit transmits a specific converted data in response to the data request from the image forming apparatus. Each of the at least one image forming apparatus includes a list requesting unit transmitting the list request to the server in accordance with a user operation, and a display unit displaying the list from the server. The data requesting unit transmits the data request for specifying the converted data selected from the list to the server, in accordance with a user operation.

Preferably, the image forming apparatus is configured to selectively support a plurality of functions. The setting information includes setting of a process that depends on any of the plurality of functions. The device information includes state of support of the plurality of functions of the image forming apparatus. The data converting unit converts, for each image forming apparatus, the print data to converted data allowing execution of image formation by the image forming apparatus, based on the function supported by the image forming apparatus, among functions necessary for executing the process included in the setting information.

Preferably, the data converting unit converts contents of the print data to contents of print data with the data of multiple pages collected, based on the device information, for each image forming apparatus incapable of printing multiple pages on one page (hereinafter referred to as, "multi-page collective printing").

Preferably, the data converting unit rearranges contents of the print data to collated manner (sort), based on the device information, for each image forming apparatus incapable of executing collated (sorted) printing.

Preferably, the data converting unit rearranges the contents of print data in reverse order of pages, based on the device information, for each image forming apparatus discharging sheets of paper in face-up manner.

Preferably, the server further includes a deleting unit for deleting, after the converted data is transmitted to the image forming apparatus, the converted data converted from the print data that corresponds to the transmitted converted data, from the data storage unit.

According to another aspect, the present invention provides a server connectable through a network to at least one information processing apparatus capable of transmitting print data including setting information related to image formation and at least one image forming apparatus capable of data communication with the server. The server receives the print data from the image processing apparatus. The server includes a device information storage unit storing in advance device information of each of the at least one image forming apparatus; a print data storage unit storing the print data from the information processing apparatus; a data converting unit converting the print data to converted data allowing image formation by each image forming apparatus, for each image forming apparatus, based on the device information; a converted data storage unit storing the converted data in correspondence with information specifying the image forming apparatus; and a converted data transmitting unit responsive to a data request from the image forming apparatus for transmitting the converted data corresponding to the image forming apparatus, stored in the converted data storage unit.

Preferably, the server further includes a list generating unit generating a list of converted data corresponding to the image forming apparatus, for each image forming apparatus, based on the converted data stored in the converted data storage unit; and a list transmitting unit responsive to a list request from the image forming apparatus, for transmitting the list corresponding to the image forming apparatus to the image forming apparatus. The converted data transmitting unit transmits a specific converted data in response to the data request from the image forming apparatus.

According to another aspect, the present invention provides a computer readable medium storing an image forming program, causing a computer connectable through a network to at least one information processing apparatus, capable of transmitting print data including setting information related to image formation, and at least one image forming apparatus capable of data communication with the server, to transmit converted data. The computer receives the print data from the image processing apparatus. The image forming program causes the computer to execute the steps of: storing in advance device information of each of the at least one image forming apparatus; storing the print data from the information processing apparatus; converting the print data to converted data allowing image formation by each image forming apparatus, for each image forming apparatus based on the device information; storing the converted data in correspondence with information specifying the image forming apparatus, and in response to a data request from the image forming apparatus, transmitting the converted data corresponding to the image forming apparatus, stored in the converted data storage unit.

According to a further aspect, the present invention provides an image forming method using an image forming system. The image forming system includes at least one information processing apparatus capable of transmitting print data including setting information related to image formation, a server receiving the print data from the information processing apparatus, and at least one image forming apparatus capable of data communication with the server. The server stores in advance device information of each of the at least one image forming apparatus. The image forming method includes the steps of the server storing the print data from the information processing apparatus, the server converting the print data to converted data allowing execution of image formation by each image forming apparatus, based on the device information, for each image forming apparatus; the server storing the converted data in correspondence with information for specifying corresponding image forming apparatus; the server transmitting the converted data corresponding to the image forming apparatus to the image forming apparatus, to the image forming apparatus, in response to the data request from the image forming apparatus, the image forming apparatus transmitting the data request to the server in accordance with a user operation; and the image forming apparatus performing an image forming process based on the converted data in accordance with a user operation.

Preferably, the image forming method further includes the steps of the server generating, based on the converted data stored in the converted data storage unit, a list of converted data corresponding to the image forming apparatus, for each image forming apparatus; the server transmitting, to the image forming apparatus, the list corresponding to the image forming apparatus, in response to a list request from the image forming apparatus; the image forming apparatus transmitting the list request to the server in accordance with a user operation; and the image forming apparatus displaying the list from the server. The data request includes information specifying the converted data selected from the list, in accordance with a user operation.

By the present invention, when the image forming apparatus forms an image of print data that possibly includes a request dependent on a specific function, the image can be formed with the request fulfilled, regardless of the difference in functions supported by the image forming apparatus or difference in command that can be interpreted by the apparatus.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 10 shows an example of data structure of converted data corresponding to one image forming apparatus, stored in a print list storage unit of the server in accordance with the embodiment of the present invention.

FIG. 11 shows an example of data structure stored in a network setting data storage unit of the server in accordance with the embodiment of the present invention.

FIG. 12 shows an example of data structure stored in a device information storage unit of the server in accordance with the embodiment of the present invention.

FIG. 13 shows an example of data structure stored in a converted data storage unit of the server in accordance with the embodiment of the present invention.

FIGS. 15A and 15B are illustrations showing the print data and the second example of converted data after converting process by the data converting unit.

FIGS. 16A and 16B are illustrations showing the print data and the third example of converted data after converting process by the data converting unit.

FIG. 19 is a block diagram showing a functional configuration of the image forming apparatus in accordance with the embodiment of the present invention.

FIG. 20 shows an exemplary display of a print list in the image forming apparatus in accordance with the embodiment of the present invention.

FIG. 21 shows an example of data structure stored in device information storage unit of the image forming apparatus in accordance with the embodiment of the present invention.

DESCRIPTION OF THE PREFERRED EMBODIMENTS

Figure 1:
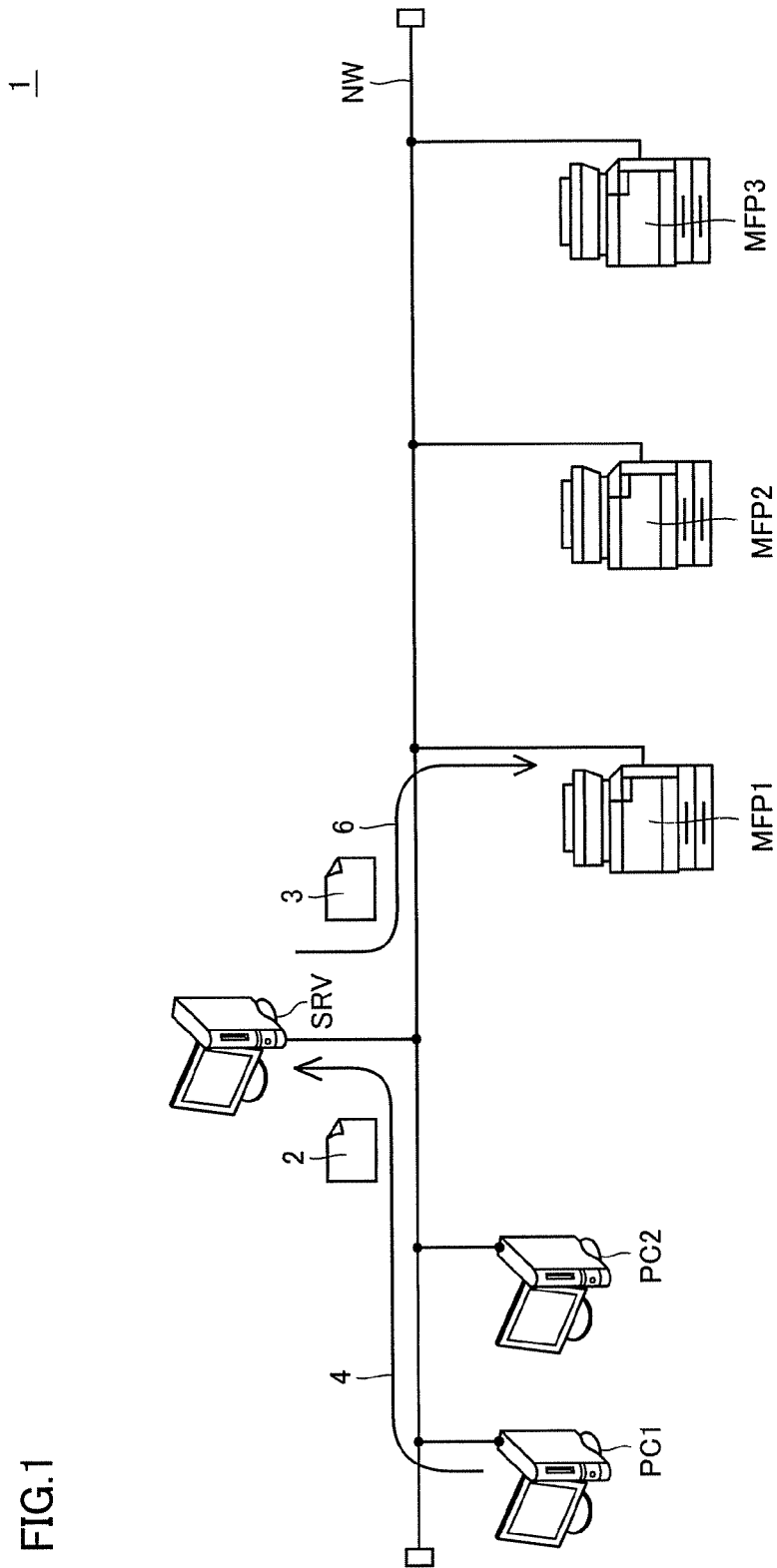
FIG. 1 schematically shows a configuration of the image forming system in accordance with an embodiment of the present invention.

Embodiments of the present invention will be described in detail with reference to the figures. In the figures, the same or corresponding portions are denoted by the same reference characters and description thereof will not be repeated.

(Overall Configuration of Image Forming System)

Referring to FIG. 1, an image forming system 1 in accordance with an embodiment of the present invention includes personal computers PC1 and PC2 as representative examples of image processing apparatus, a server SRV, and image forming apparatuses MFP1, MFP2 and MFP3, all connected to one same network NW.

Personal computers PC1 and PC2, server SRV, and image forming apparatuses MFP1, MFP2 and MFP3 are configured to allow data communication with each other. The network NW may be a private line such as LAN (Local Area Network) or WAN (Wide Area Network), or a public line such as virtual private network, which may be partially or fully implemented to realize wireless communication such as wireless LAN. The present invention is applicable to a configuration that allows data communication between personal computer PC1 or PC2 and server SRV and between the server SRV and image forming apparatus MFP1, MFP2 or MFP3, and therefore, independent networks may be formed to connect these components to each other.

In personal computers PC1 and PC2, application programs including document creation and spread sheet are installed, and print data 2 is generated from a document or the like formed by the user using such an application program. More specifically, a printer driver installed beforehand in personal computer PC1 or PC2 generates control codes (typically, a page description language) that can be interpreted by image forming apparatuses MFP1 to MFP3, in accordance with a drawing instruction output from the application program or the operating system (OS). The print data 2 includes setting information related to printing, set by the user at the time of generation.

Personal computer PC1, PC2 transmits print data 2 generated in this manner to server SRV (transmission path 4). When pull print is not performed, personal computer PC1 or PC2 may directly transmit the print data 2 to any of image forming apparatuses MFP1 to MFP3.

Server SRV receives and stores the print data 2 transmitted from personal computer PC1, PC2, and converts the print data to converted data 3 suitable for image forming apparatuses MFP1 to MFP3, and when a pull print request is received from any of image forming apparatuses MFP 1 to MFP3, transmits the converted data 3 to the image forming apparatus as the source of request (transmission path 6).

Image forming apparatuses MFP1 to MFP3 are typically a Multi Function Peripheral (MFP) having a plurality of functions including copying function, facsimile function and scanner function. In accordance with a user operation, image forming apparatuses MFP1 to MFP3 transmit, to the server SRV, a pull print request for pulling selected converted data 3 from among converted data 3 stored in the server SRV, that is, for obtaining the converted data 3. Then, image forming apparatuses MFP1 to MFP3 perform image forming process based on the converted data 3 from server SRV. The image forming process includes printing on paper medium and facsimile transmission.

Particularly, the server SRV in accordance with the present embodiment generates print data (converted data 3) by converting setting information and data body (such as character code and image data) included in print data 2 stored in server SRV, for each of the image forming apparatuses MFP1 to MFP3. In response to a list request from image forming apparatuses MFP1 to MFP3, a list of converted data 3 stored in server SRV is transmitted and, in response to a data request from image forming apparatuses MFP1 to MFP3, converted data corresponding to each image forming apparatus and a print list are transmitted. In this manner, server SRV in accordance with the present embodiment transmits the converted print data (converted data 3) to image forming apparatuses MFP1 to MFP3, and therefore, regardless of capabilities of image forming apparatuses MFP1 to MFP3, images can be formed by image forming apparatuses MFP1 to MFP3 in accordance with the printing method set by personal computer PC1 or PC2.

In the following, a configuration that realizes such a function will be described. In the following, personal computers PC1 and PC2 will be generally represented as "personal computer PC" and image forming apparatuses MFP1 to MFP3 will be generally represented as "image forming apparatus MFP."

(Hardware Configuration of Image Forming Apparatus)

Figure 2:
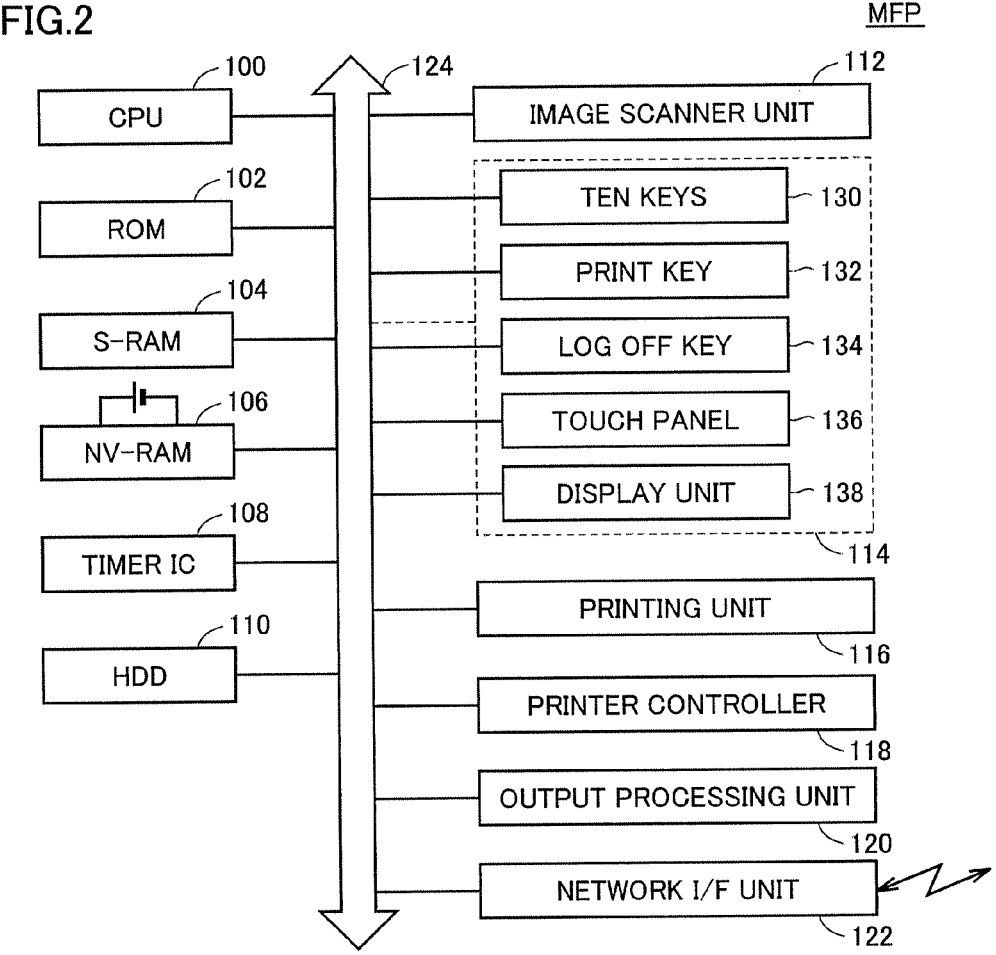
FIG. 2 schematically shows plain hardware configuration of the image forming apparatus in accordance with the embodiment of the present invention.

Referring to FIG. 2, image forming apparatus MFP in accordance with the embodiment of the present invention includes a CPU (Central Processing Unit) 100, an ROM (Read Only Memory) 102, an S-RAM (Static-Random Access Memory) 104, an NV-RAM (Non-Volatile Random Access Memory) 106, and a timer IC (Integrated Circuit) 108. These parts are connected to each other through a bus 124

CPU 100 reads a program stored in advance in ROM 102 or the like to S-RAM 104 as a work memory and executes the program, whereby the process in accordance with the present embodiment is realized. Further, NV-RAM 106 stores various settings related to image formation of the MFP in a non-volatile manner. Particularly, NV-RAM 106 stores device information including the state of functions supported in the image forming apparatus MFP. Such device information is set before shipment, or by a maintenance person when a new function is added. Alternatively, CPU 100 may periodically detect supported functions and the device information may be updated accordingly. Timer IC 108 is configured to include a quartz oscillator or the like and measures current time.

Image forming apparatus MFP further includes an image scanner unit 112, an operation panel unit 114, a printing unit 116, a printer controller 118, and an output processing unit 120.

Image scanner unit 112 is a part for realizing the scanner function, at which a document is scanned and image data is generated. Typically, image scanner unit 112 includes a loading tray for setting the document, a platen glass, a feeding unit for feeding the document set on the loading tray to the platen glass one by one, and an ejection tray for ejecting the scanned document (all not shown). It is noted that image scanner unit 112 is not always necessary to realize the pull print configuration in accordance with the present invention.

Operation panel unit 114 includes ten-keys 130, a PRINT key 132, a log-off key 134, a touch panel 136 and a display unit 138 integrated together, and it is placed on a surface portion of image forming apparatus MFP. Ten-keys 130, PRINT key 132, log-off key 124 and touch panel 136 function as an input unit for receiving a user operation, and display unit 138 functions as a display for presenting scanned images urging the user to make selection or determine various settings. Display unit 138 is typically implemented by a liquid crystal panel or the like, and touch panel 136 is arranged on the display surface of display unit 138.

Printing unit 116 is a part for performing the process of printing the image on paper medium, and it typically includes an image forming unit including an exposurer and a developing roller, a transfer roller for transferring the toner image formed by the image forming unit to the paper medium, a fixer for fixing the transferred toner image, and a control circuit controlling operation of these units.

Printer controller 118 converts print data (converted data) from personal computer PC or image data scanned by image scanner unit 112 to data suitable for the print process at printing unit 116. Typically, when the image forming apparatus MFP is for color processing, printer controller 118 converts the print data (converted data) or image data to raster data of four colors, that is, yellow (Y), magenta (M), cyan (C) and black (K), and outputs the raster data of respective colors to printing unit 116.

Output processing unit 120 is a part for processing the paper medium after the image is formed thereon by printing unit 116, and typically it performs the processes of "sort", "group", "staple" and "punch". Here, "sort" refers to a process in which, when a number of copies of a document containing a plurality of pages are to be output, sheets of paper having images formed in the same page order as the original document are output by the set number of copies, that is, a so-called collated printing. "Group" refers to a process in which sheets of paper of the set number of copies are output grouped by page of the original document. "Staple" refers to a process of fastening the output sheets of paper by staples, and "punch" refers to a process of punching a hole or holes in the output sheets of paper.

Further, image forming apparatus MFP includes a hard disk unit (HDD Hard Disk Drive) 110 and a network interface (I/F) unit 122.

Hard disk unit 110 is a storage unit for storing relatively large amount of data in a non-volatile manner, and it stores converted data from server SRV and image data scanned by image scanner unit 112. Network interface unit 122 is a part for enabling data communication with personal computer PC or server SRV through the network NW.

(Hardware Configuration of Personal Computer and Server)

Figure 3:
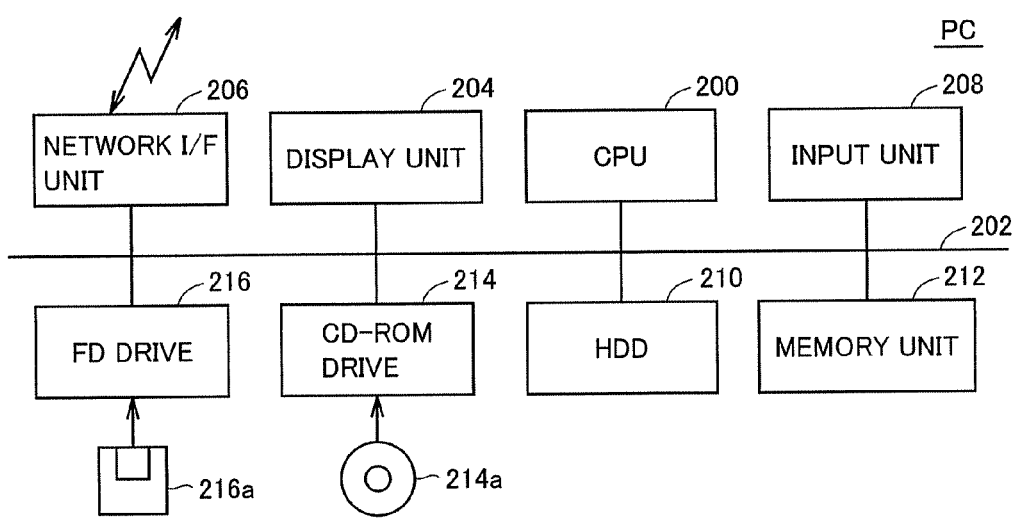
FIG. 3 schematically shows plain hardware configuration of the personal computer in accordance with the embodiment of the present invention.

Referring to FIG. 3, personal computer PC in accordance with the embodiment of the present invention includes a CPU 200 executing various programs including the operating system, a memory unit 212 temporarily storing data necessary for executing a program in CPU 200, and a hard disk unit 210 for storing the program to be executed by CPU 200 in a non-volatile manner. Such a program is read by a CD-ROM (Compact Disk-Read Only Memory) drive 214 or a flexible disk (FD) drive 216 from a CD-ROM 214a or a flexible disk 216a, respectively.

CPU 200 receives an operation request from the user through an input unit 208 implemented by a keyboard or a mouse, and provides a screen image output generated by execution of a program to a display unit 204. Further, CPU 200 performs data communication with server SRV or image forming apparatus MFP through network interface (I/F) unit 206 provided by an LAN card or the like. These parts are connected to each other through an internal bus 202.

The hardware configuration of server SRV is basically similar to that shown in FIG. 3 and, therefore, detailed description will not be repeated. In server SRV, the print data from personal computer PC is stored in hard disk unit 210.

(Overall Process Sequence of Image Forming System)

First, the overall process in the image forming system in accordance with the present embodiment will be described with reference to FIG. 4.

Figure 4:
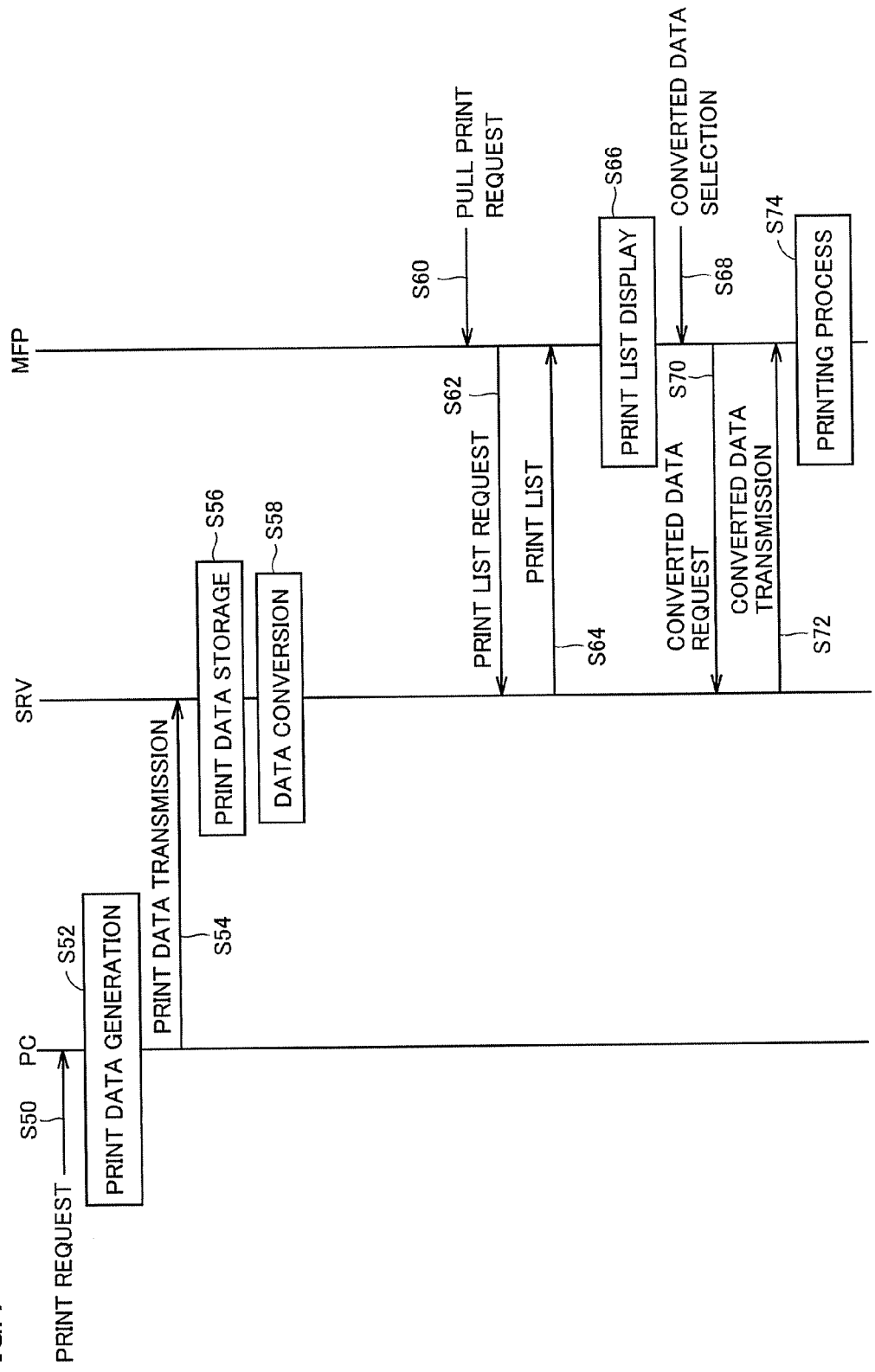
FIG. 4 is a sequence diagram representing the overall process procedure in the image forming system in accordance with the embodiment of the present invention.

Referring to FIG. 4, first, to an application program executed on personal computer PC, the user applies a print request by an operation of a mouse or the like (step S50), and then, personal computer PC generates print data corresponding to the application program (step S52). The personal computer PC transmits the generated print data to server SRV (step S54). Then, server SRV stores the print data from personal computer PC in hard disk unit 210 (step S56). Further, server SRV converts the print data to converted data based on the printing method available in each image forming apparatus MFP (step S58). Then, the converted data is stored in the hard disk unit 210 (FIG. 3) together with information (for example, IP address) for specifying each image forming apparatus MFP.

Next, the user operates operation panel unit 114 (FIG. 2) of image forming apparatus MFP and applies a pull print request (step S60), and then image forming apparatus MFP transmits a print list request to server SRV (step S62). In response to the print list request, server SRV transmits the list as a list of stored converted data to image forming apparatus MFP (step S22).

Image forming apparatus MFP displays the print list from server SRV on display unit 138 (FIG. 2) (step S66).

The user selects desired converted data, with reference to the print list displayed on display unit 138 (step S68). In response to the selection of converted data by the user, image forming apparatus MFP transmits a print data request for specifying the selected converted data to server SRV (step S70). In response to the print data request, server SRV transmits the specific (selected) converted data among the stored converted data, to the image forming apparatus MFP (step S72). Based on the converted data from server SRV, image forming apparatus MFP executes the printing process (step S74). By the process steps described above, the pull print process is completed.

In the following, the functional configuration and process procedure of each apparatus will be described in detail.

(Functional Configuration and Process Procedure of Personal Computer)

Figure 5:
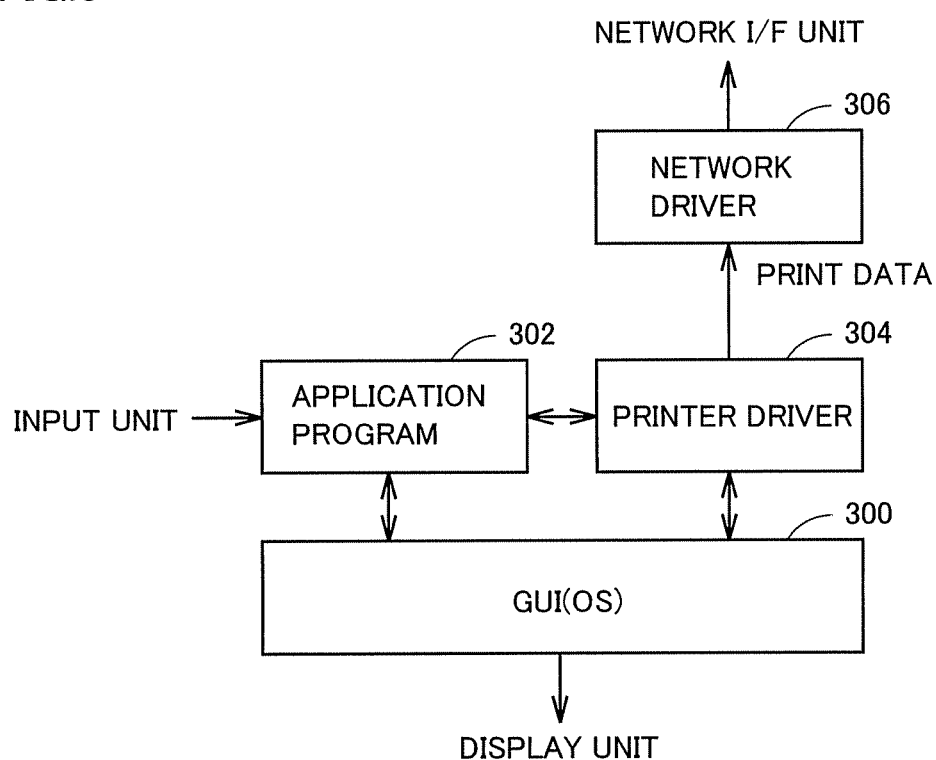
FIG. 5 is a block diagram showing a functional configuration related to print data generation in the personal computer in accordance with the embodiment of the present invention.

FIG. 5 is a block diagram showing a functional configuration related to print data generation in the personal computer PC in accordance with the embodiment of the present invention. These functions are realized when CPU 200 reads a program stored in advance in hard disk unit 210 or the like to memory unit 212 and executes the program.

Referring to FIG. 5, personal computer PC includes, as its functions, GUI 300 as a part of the OS, an application program 302, a printer driver 304, and a network driver 306.

GUI 300 updates image display on display unit 204 (FIG. 3), in response to a drawing instruction output from application program 302 or printer driver 304. Application program 302 is typically a program for document creation or spread sheet processing, and executes various processes in accordance with an operation of input unit 208 (FIG. 3) by the user. Printer driver 304 generates print data in accordance with the output of application program 302, in response to the print instruction and the drawing instruction from application program 302. Further, printer driver 304 displays a print setting image allowing the user to perform print setting, on display unit 204, when the print data is generated. Receiving the print data from printer driver 304, network driver 306 controls network interface unit 206 (FIG. 2) and transmits the print data to server SRV.

Figure 6:
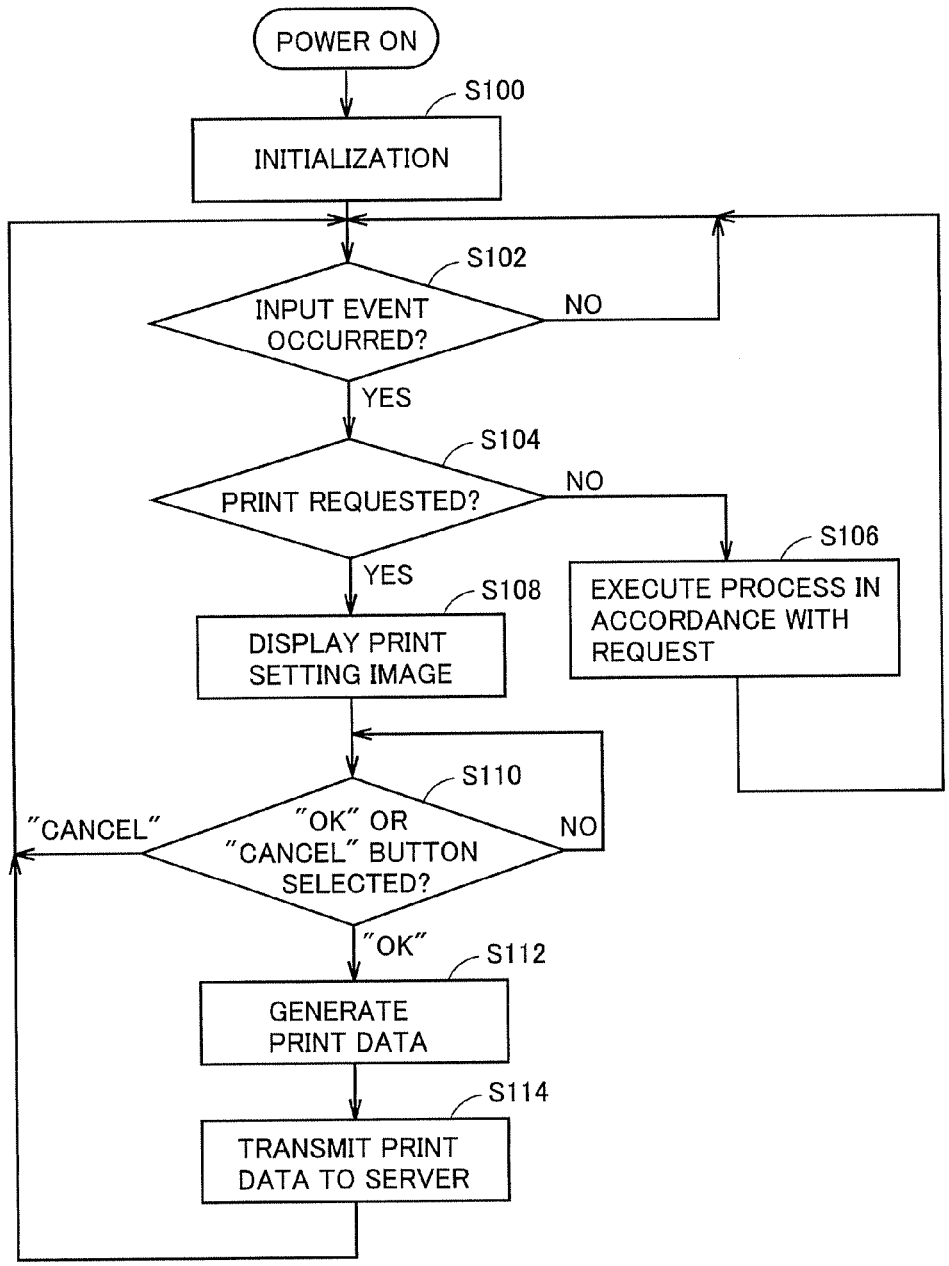
FIG. 6 is a flowchart representing process procedure related to print data generation in the personal computer in accordance with the embodiment of the present invention.

FIG. 6 shows process procedure related to print data generation in the personal computer PC in accordance with the embodiment of the present invention.

Referring to FIGS. 3 and 6, first, when the user turns on the power of personal computer PC, personal computer PC is activated and initialization takes place (step S100). Initialization includes general processes such as clearing of memory unit 212, loading of the OS to memory unit 212, execution of the OS by CPU 200 and setting of initial values (default values). After the end of initialization, CPU 200 determines whether there is any input event (operation request) occurred by a user operation through input unit 208 (step S102). If there is no input event occurred (NO at step S102), CPU 200 waits until any input event occurs (step S102).

If there is any input event occurred (YES at step S102), CPU 200 determines whether the occurred event is a print request or not (step S104). If the occurred event is not a print request (NO at step S104), a process in accordance with the request is executed (step S106). After execution of the process, CPU 200 again waits until occurrence of any input event (step S102).

If the occurred event is a print request (YES at step S104), CPU 200 displays a print setting image on display unit 204 (step S108). More specifically, printer driver 304 shown in FIG. 5 outputs a drawing instruction for displaying the prescribed print setting image to GUI 300, and GUI 300 outputs a signal for displaying the print setting image to display unit 204.

Figures 7, 8:
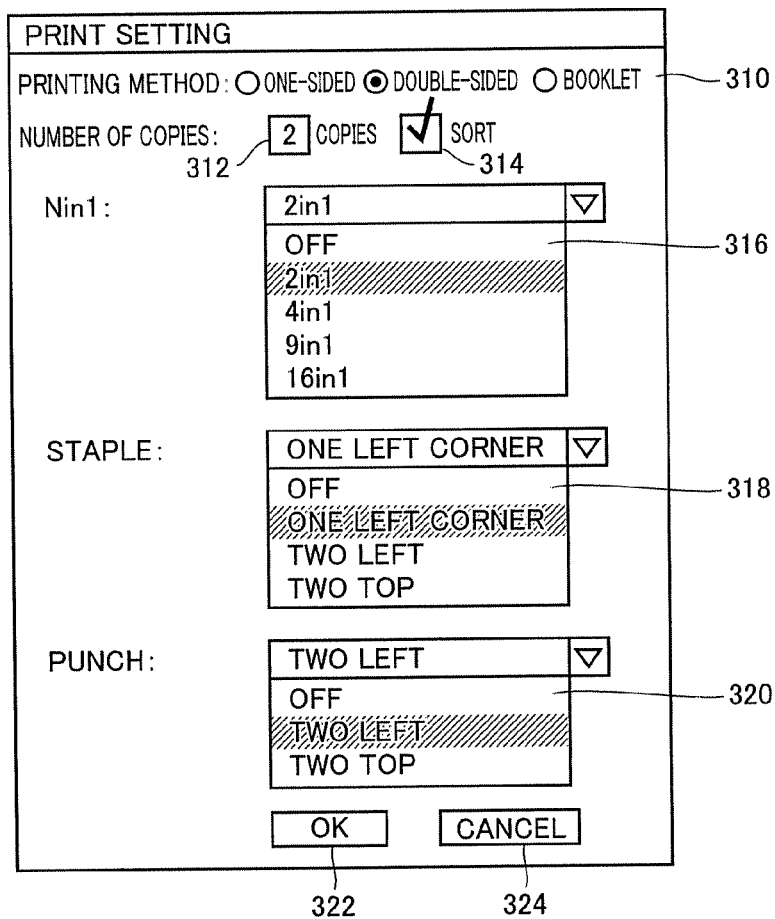
FIG. 7 shows an example of a print setting image in the personal computer in accordance with the embodiment of the present invention.
FIG. 8 shows an example of print data generated by the personal computer in accordance with the embodiment of the present invention.

FIG. 7 shows an example of the print setting image of the personal computer PC in accordance with the embodiment of the present invention.

Referring to FIG. 7, by way of example, on the print setting image, six setting items 310, 312, 314, 316, 318 and 320 of "printing method", "number of copies", "sort", "Nin1", "staple" and "punch" are arranged, respectively. Here, as to the setting item 310 of "printing method", one of "one-sided", "double-sided" and "booklet" is selectable, and by the selection, one-sided printing, double-sided printing and booklet printing are designated, respectively. By the setting item "number of copies", the number of copies to be output from image forming apparatus MFP can be input arbitrarily. By the setting item 314 of "sort", whether sorting process is necessary or not at the time of output from image forming apparatus MFP can be set by checking the box. By setting item 316 of "Nin1", setting for multi-page collective printing, in which images of a plurality of pages are reduced and printed on one sheet, can be selected, by selecting one from a pull down menu. For instance, "2in1" represents printing of images of two pages reduced on one sheet of paper. By the setting item 318 of "staple", one setting of a position where the sheets output from the image forming apparatus are fastened by the staple can be selected from the pull down menu. By the setting item 320 of "punch", one setting of a position, where a hole or holes is/are punched in the sheets output from the image forming apparatus, can be selected from the pull down menu.

In this manner, the user can arbitrarily determine the print setting on the personal computer PC. These setting items, however, define processes dependent on any of a plurality of functions supported by the image forming apparatus MFP, and dependent on the state of functions supported by the image forming apparatus MFP as the output destination, it is not always possible to execute the image forming process fully reflecting these setting items.

When the user sets print setting and selects "OK" button 322, print setting is complete. When "CANCEL" button 324 is selected, the print setting is cancelled, and subsequent process of generating print data is not executed.

Again referring to FIG. 6, CPU 200 confirms whether "OK" button 322 or "CANCEL" button 324 is selected (step S110). When neither of "OK" button 322 nor "CANCEL" button 324 is selected (NO at step S110), CPU 200 waits until either "OK" button 322 or "CANCEL" button 324 is selected (step S110).

When "OK" button 322 is selected ("OK" at step S110), CPU 200 generates print data based on the print setting set by the user (step S112). Then, CPU 200 transmits the generated print data to server SRV (step S114). Then, the process returns to step S102.

In contrast, when "CANCEL" button 324 is selected ("CANCEL" at step S110), CPU 200 does not generate any print data and the process returns to step S102.

Though an example in which the print setting image is always displayed has been described in connection with the flowchart above, the print data may be generated in accordance with the initial setting without displaying the print setting image, if the user does not request any change from the initial setting (default setting) set in advance.

FIG. 8 shows an example of the print data generated by the personal computer PC in accordance with the embodiment of the present invention. The print data in accordance with the present embodiment is generated using PDL (Printer Description Language) as page description language designating character data to be output as well as information of corresponding font type and position of arrangement. Representative examples of PDL include PCL (Printer Command Language) and PostScript, and in FIG. 8, print data prepared by PCL is shown as an example.

Referring to FIG. 8, the print data includes setting information 330 describing the print setting, and data body 332. Though data body 332 actually include huge amount of control codes, it is shown in a simplified manner in FIG. 8.

Setting information 330 consists of control codes each starting with "PJL (Print Job Language)", indicating that it is a print setting. By way of example, FIG. 8 shows nine lines of control codes 331 to 339. Control codes 331 to 339 describe "resolution", "number of copies", "necessity of sort", "necessity of double-sided printing", "necessity and position of stapling", "setting of multi-page collective printing (Nin1)", "necessity of finisher process", "necessity of punching" and "designation of print language", respectively.

In this manner, personal computer PC transmits the print data containing the setting information related to printing set by the user, to server SRV.

(Functional Configuration and Process Procedure of Server)

Figure 9:
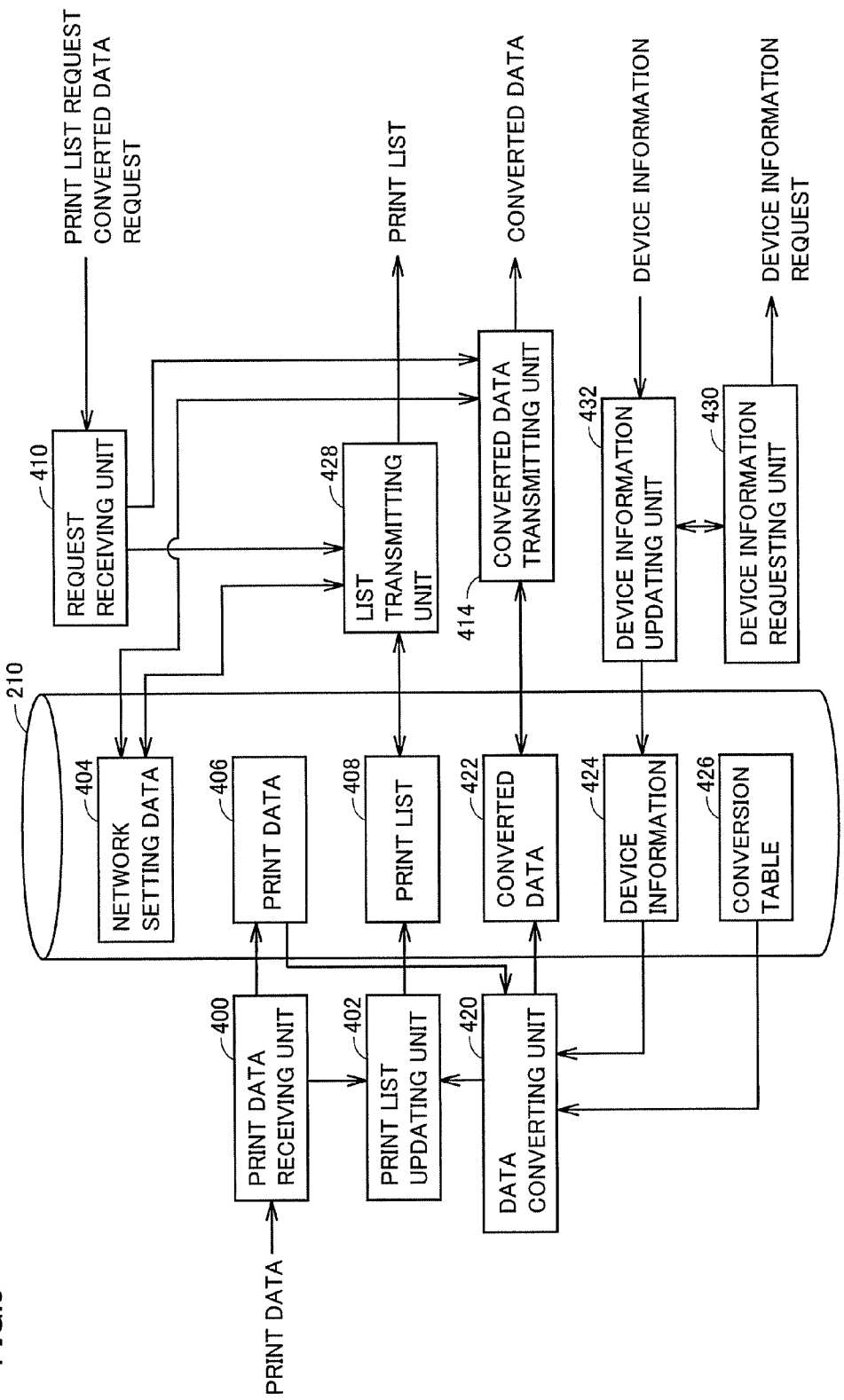
FIG. 9 is a block diagram showing functional configuration of a server in accordance with the embodiment of the present invention.

Referring to FIG. 9, server SRV in accordance with the embodiment of the present invention includes a print data receiving unit 400, a print list updating unit 402, a network setting data storage unit 404, a print data storage unit 406, a print list storage unit 408, a converted data storage unit 422, a device information storage unit 424, a conversion table storage unit 426, a request receiving unit 410, a list transmitting unit 428, a converted data transmitting unit 414, a device information requesting unit 430, and a device information updating unit 432, as its functions. Request receiving unit 410, list transmitting unit 428, converted data transmitting unit 414, device information requesting unit 430 and device information updating unit 432 are realized by CPU 200 reading a program stored in advance in hard disk unit 210 or the like to memory unit 212 and executing the program. Further, network setting data storage unit 404, print data storage unit 406, print list storage unit 408, converted data storage unit 422, device information storage unit 424 and conversion table storage unit 426 are formed at a prescribed area of hard disk unit 210.

Print data receiving unit 400 receives print data from personal computer PC, and stores the received print data in print data storage unit 406. Further, print data receiving unit 400 outputs information including document name, transmission source, data size and the like of the received print data to print list updating unit 402 and to data converting unit 420 through print data storage unit 406.

Print list updating unit 402 newly generates the list of converted data (print list) or updates existing print list, based on the information from data converting unit 420, for each image forming apparatus MFP. Then, print list updating unit 402 stores the generated or updated print list in print list storage unit 408.

FIG. 10 shows an example of data structure of converted data corresponding to one image forming apparatus MFP, stored in print list storage unit 408 of the server SRV in accordance with the embodiment of the present invention.

Referring to FIG. 10, print list updating unit 402 allocates job IDs as identification numbers of print data before conversion successively to the converted data converted for each image forming apparatus MFP, and obtains document names (file names). Then, print list updating unit 402 stores, in the form of a list, the job IDs and the corresponding document names, in print list storage unit 408.

It is noted, however, that print list updating unit 402 may have such a configuration that it allocates job IDs as identification numbers of the print data successively to the print data received from the personal computer PC, obtains the document names (file names) and stores the job IDs and the corresponding document names in the form of a list in print list storage unit 408. Specifically, print list updating unit 402 may form the list based on the converted data converted for each image forming apparatus MFP, or it may form the list based on the print data received from the personal computer PC.

Again referring to FIG. 9, network setting data storage unit 404 stores network setting information of the image forming apparatus MFP capable of data communication with server SRV. Specifically, network setting data storage unit 404 stores network address (typically, IP address) of each image forming apparatus MFP, and these pieces of information are set beforehand.

FIG. 11 shows an example of data structure stored in network setting data storage unit 404 of the server SRV in accordance with the embodiment of the present invention.

Referring to FIG. 11, network setting data storage unit 404 stores the IP address and the machine type, in correspondence with the name of each image forming apparatus MFP capable of data communication with the server SRV. The setting information transmitting unit 412 and converted data transmitting unit 414, which will be described later, obtain data transmission destination based on these pieces of information stored in network setting data storage unit 404.

FIG. 12 shows an example of data structure stored in device information storage unit 424 of the server SRV in accordance with the embodiment of the present invention.

Referring to FIG. 12, by way of example, device information storage unit 424 stores, in the form of a list, the state of functions supported by each of the image forming apparatuses MFP that are capable of data communication with server SRV. Specifically, device information storage unit 424 stores, in correspondence to each of a plurality of functions that can be implemented in the image forming apparatus MFP, the value "Y" indicating that the function is supported or the value "N" indicating that the function is not supported, separately for each image forming apparatus MFP.

Again referring to FIG. 9, data converting unit 420 successively generates converted data for each of the image forming apparatuses MFP, from the print data received from personal computer PC. More specifically, data converting unit 420 converts the print data to converted data appropriate for the printing capability of image forming apparatus MFP, for each image forming apparatus MFP, based on the setting information from print data receiving unit 400 or from print data storage unit 406 and on the device information of each image forming apparatus MFP stored in advance in device information storage unit 424.

In other words, data converting unit 420 extracts any function that is not supported by each image forming apparatus MFP among the functions necessary to execute the process included in the setting information, and generates print data (converted data) that has been subjected to the process corresponding to that function by server SRV. In the server SRV in accordance with the present embodiment, data converting unit 420 extracts the functions necessary to execute the process included in the setting information and the functions supported by each image forming apparatus MFP, and compares the extracted functions with each other to identify the function not supported by each image forming apparatus MFP.

Specifically, data converting unit 420 converts, for each of said image forming apparatuses MFP, said print data to converted data that allows execution of image formation by the image forming apparatus MFP, based on the device information. By way of example, for the image forming apparatus MFP that is not capable of multi-page collective (Nin1) printing, data converting unit 420 converts the contents of said print data to contents of print data with the data of multiple pages reduced and collected, based on said device information, as will be described later. For the image forming apparatus MFP that is not capable of sorted printing, data converting unit 420 arranges the contents of said print data in the sorted (collated) manner, based on the device information. In addition, for the image forming apparatus MFP that discharges sheets of paper face-up, data converting unit 420 arranges the contents of said print data in the reverse order of pages, based on the device information. Details of the process of converting the print data to converted data by data converting unit 420 will be described later.

Conversion table storage unit 426 stores a data conversion method and a data conversion program (library for data conversion) for the print data by data converting unit 420. More specifically, conversion table storage unit 426 stores the conversion table. The data conversion table stores the data conversion method and the data conversion program (library for data conversion) in correspondence with the function not supported by the image forming apparatus (control code that cannot be interpreted by the image forming apparatus MFP). Data converting unit 420 converts the print data transmitted from the personal computer PC based on the device information of each image forming apparatus (function not supported by each image forming apparatus) and on the conversion table, for each image forming apparatus MFP.

FIG. 13 shows an example of data structure stored in converted data storage unit 422 in accordance with the embodiment of the present invention.

Referring to FIG. 13, data converting unit 420 successively generates converted data appropriate for each image forming apparatus MFP capable of data communication with the server SRV, for one print file, and successively stores the generated converted data in converted data storage unit 422 in correspondence with the job ID (identification number) of the print file and the document name (file name). Therefore, it follows that for one same print file (job ID), conversion data same in number as the number of image forming apparatuses MFP are stored.

It is noted, however, that the converted data corresponding to the image forming apparatuses of the same type (having the same printing capability) (in FIG. 13, MFP2 and MFP3) is the same. By way of example, CPU 200 may store the converted data generated machine type by machine type in converted data storage unit 422, and the address of storage of the converted data may be stored in print list storage unit 408 in correspondence with information for specifying the image forming apparatus MFP and the job ID (identification number) of the print file.

Again referring to FIG. 9, receiving the print list request from any of the image forming apparatuses MFP, request receiving unit 410 outputs the print list request to list transmitting unit 428, and receiving a print data request from any of the image forming apparatuses MFP, outputs the print data request to the converted data transmitting unit 414.

In response to the print list request from request receiving unit 410, list transmitting unit 428 reads the print list corresponding to the image forming apparatus as the source of request transmission, from print list storage unit 408. Then, list transmitting unit 428 transmits the read print list to the image forming apparatus MFP as the source of request transmission.

In response to the print data request from request receiving unit 410, converted data transmitting unit 414 reads the print data specified by the print data request that corresponds to the image forming apparatus MFP as the source of request transmission, from converted data storage unit 422. Then, converted data transmitting unit 414 transmits the read converted data to the image forming apparatus MFP as the source of request transmission.

(Data Converting Process)

Figure 14A:
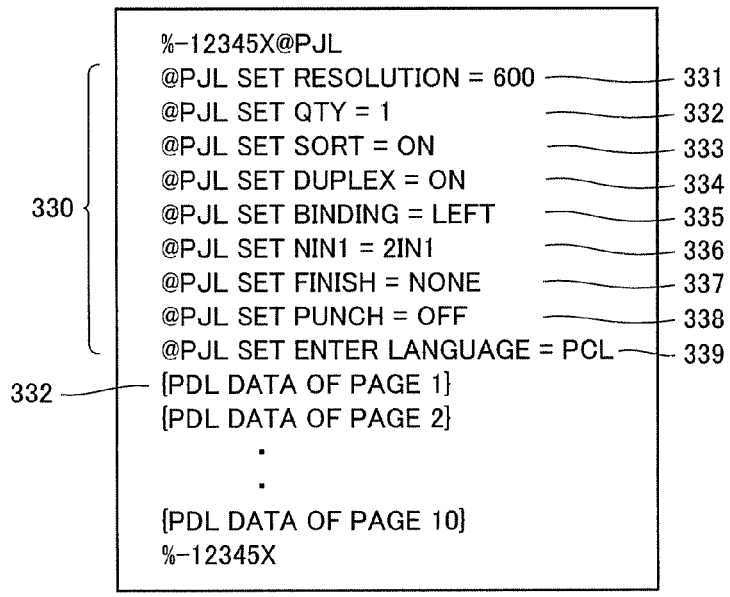
FIGS. 14A and 14B are illustrations showing the print data and the first example of converted data after converting process by the data converting unit.
Figure 14B:
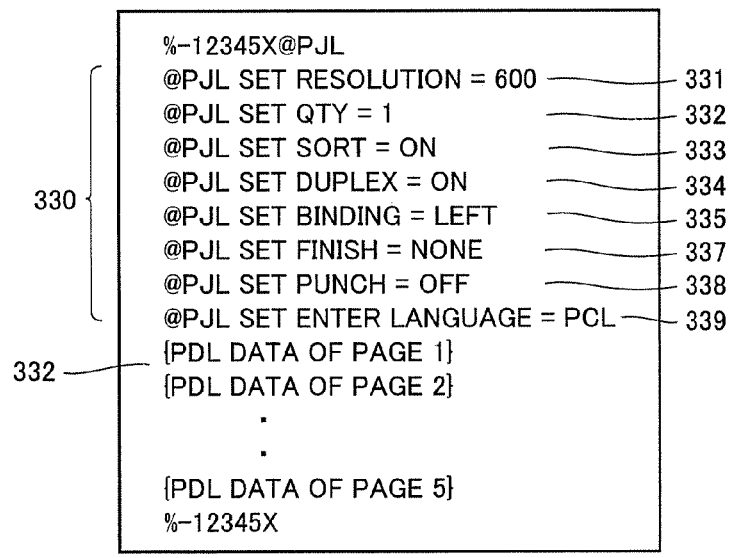

In the following, the data converting process for converting the print data to the converted data by data converting unit 420 will be described with reference to typical examples. FIGS. 14A and 14B represent the print data and the first example of converted data after the converting process by data converting unit 420. FIG. 14A shows the print data before data conversion by data converting unit 420. FIG. 14B shows the converted data, converted by data converting unit 420.

First, referring to FIGS. 14A and 14B, the process when "multi-page collective printing" (Nin1) 336 is designated in setting information 330 and CPU 101 functioning as data converting unit 420 converts the print data transmitted from personal computer PC to converted data suitable for the image forming apparatus MFP that is not capable of "multi-page collective printing" will be described.

As shown in FIG. 14A, setting information 330 of the print data transmitted from personal computer PC includes control codes of "resolution", "number of copies", "necessity of sorting", "necessity of double-sided printing", "necessity and position of stapling", "designation of multi-page collective printing (Nin1)", "necessity of finisher process", "necessity of punching" and "designation of printing language." The image forming apparatus MFP of interest does not have the function of executing the "multi-page collective printing". Specifically, image forming apparatus MFP cannot interpret "multi-page collective printing" described in the control code 335.

CPU 101 reads the device information of the image forming apparatus MFP of interest stored in device information storage unit 424, and determines executable printing function. Specifically, CPU 101 identifies the control code that cannot be interpreted by the image forming apparatus MFP. In the example shown in FIGS. 14A and 14B, CPU 101 determines that the image forming apparatus MFP is incapable of "multi-page collective printing", and deletes the control code 335 from the print data, and the contents described in data body 332 are converted to the contents after the page reduction and collection.

Thus, it becomes possible for the image forming apparatus MFP of interest to perform image formation to provide the same result as provided by page reduction and collection, without interpreting the "designation of multi-page collective printing", that is, without performing the process of "multi-page collective printing."

FIGS. 15A and 15B represent the print data and the second example of converted data after converting process by data converting unit 420. FIG. 15A shows the print data before data conversion by data converting unit 420, and FIG. 15B shows the converted data after data conversion by data converting unit 420.

Here, the process when CPU 101 functioning as data converting unit 420 converts the print data transmitted from personal computer PC to converted data suitable for the image forming apparatus MFP that discharges sheets of paper in face-up manner will be described. The discharge with face-up refers to the method of discharging sheets of paper in which on the printed surface of a sheet on which image is formed first, the sheet of paper printed next is stacked.

As shown in FIG. 15A, data body 332 of print data transmitted from personal computer PC contains PDL data from page 1 to page 10 in order. Therefore, when the image forming apparatus MFP of interest forms images based on the print data, it follows that page 10 is printed last, and the printing process ends with page 10 positioned at the top and page 1 at the bottom. Namely, it is necessary for the user to rearrange the pages himself/herself after the end of printing.

CPU 101 in accordance with the present embodiment reads printing functions that can be executed by the image forming apparatus stored in device information storage unit 424, and successively determines any control code that cannot be interpreted by the image forming apparatus MFP, method of paper discharge and the like. CPU 101 also determines whether the method of paper discharge of the image forming apparatus MFP is face up or not, and rearranges the PDL data described in data body 332 in reverse order page by page, as needed. Specifically, as shown in FIGS. 15A and 15B, CPU 101 rearranges the PDL data to start from page 10 to page 1 in the data body 332 of the converted data.

As a result, even by the image forming apparatus that discharges sheets of paper in face-up manner, the printing process can be completed with page 1 positioned at the top and page 10 at the bottom, without the necessity of rearranging the pages afterwards.

FIGS. 16A and 16B show the print data and the third example of converted data after the converting process by data converting unit 420. FIG. 16A shows the print data before data conversion by data converting unit 420, and FIG. 16B shows the converted data after data conversion by data converting unit 420.

Referring to FIGS. 16A and 16B, the process when control code 333 designating "necessity of sorting" of setting information 330 is ON (sorting necessary) and CPU 101 functioning as data converting unit 420 converts the print data transmitted from personal computer PC to converted data suitable for the image forming apparatus that is not capable of "sorting" will be described.

As shown in FIG. 16A, setting information 330 of the print data transmitted from personal computer PC includes control codes of "resolution", "number of copies", "necessity of sorting", "necessity of double-sided printing", "necessity and position of stapling", "designation of multi-page collective printing", "necessity of finisher process", "necessity of punching" and "designation of printing language." The image forming apparatus MFP of interest does not have the function of "sorting". Specifically, image forming apparatus MFP cannot interpret "necessity of sorting" described in control code 333.

CPU 101 reads the device information of the image forming apparatus of interest stored in device information storage unit 424, and determines executable printing functions. Specifically, CPU 101 determines control codes that cannot be interpreted by the image forming apparatus. In the example shown in FIGS. 16A and 16B, CPU 101 determines that the image forming apparatus MFP is incapable of "sorting", and deletes control code 333 from print data and changes control code 332, so that the contents described in data body 332 are converted to the contents after sorting.

By way of example, assume that 2 copies of data containing 3 pages are to be printed. In that case, CPU 101 deletes control code 333 of "necessity of sorting" from the print data read from print data storage unit 406, changes control code 332 of "number of copies" to "1", and data of 1 to 3 pages are described twice successively in order on data body 332. Then, CPU 101 stores the print data changed in this manner in converted data storage unit 422, together with information for specifying the image forming apparatus MFP1 that is incapable of "sorting".

In this manner, even though the image forming apparatus MFP does not have the function of "sorting", image formation (printing and paper discharge) in the similar manner as when "sorting" is done can be attained. By way of example, when memory capacity of the image forming apparatus MFP of interest is too small to store all data described in data body 332, it becomes possible to print in the same manner as when "sorting" is done, that is, when "collated printing" is done by the image forming apparatus MFP, by means of the server SRV of the present invention.

As described above, in response to a request from the image forming apparatus MFP, the list of converted data corresponding to each image forming apparatus MFP converted in advance in the server SRV as well as the converted data are transmitted to the image forming apparatus MFP.

The contents of device information of each image forming apparatus MFP stored in advance in device information storage unit 424 may be manually updated when an image forming apparatus MFP is newly connected to the network. As regards the server SRV and the image forming apparatuses MFP in accordance with the present embodiment, by way of example, a configuration is adopted in which the server asks each image forming apparatus MFP for the device information. Specifically, device information requesting unit 430 and device information updating unit 432 realize these functions. Device information requesting unit 430 transmits a device information request to each image forming apparatus MFP at every prescribed interval or at a timing of occurrence of some event. Broadcast transmission of the device information request is desirable. Device information updating unit 432 receives the device information transmitted from each image forming apparatus MFP in response to the device information request from device information requesting unit 430, and successively updates the contents of information storage unit 424 based on the received device information, as will be described later.

As to the correspondence between various functional blocks shown in FIG. 9 and the present invention, print data storage unit 406 corresponds to the "data storage unit", device information storage unit 424 corresponds to the "device information storage unit", print list updating unit 402 corresponds to the "list generating unit", data converting unit 420 corresponds to the "data converting unit", list transmitting unit 428 corresponds to the "list transmitting unit", and converted data transmitting unit 414 corresponds to the "converted data transmitting unit."

Figure 17:
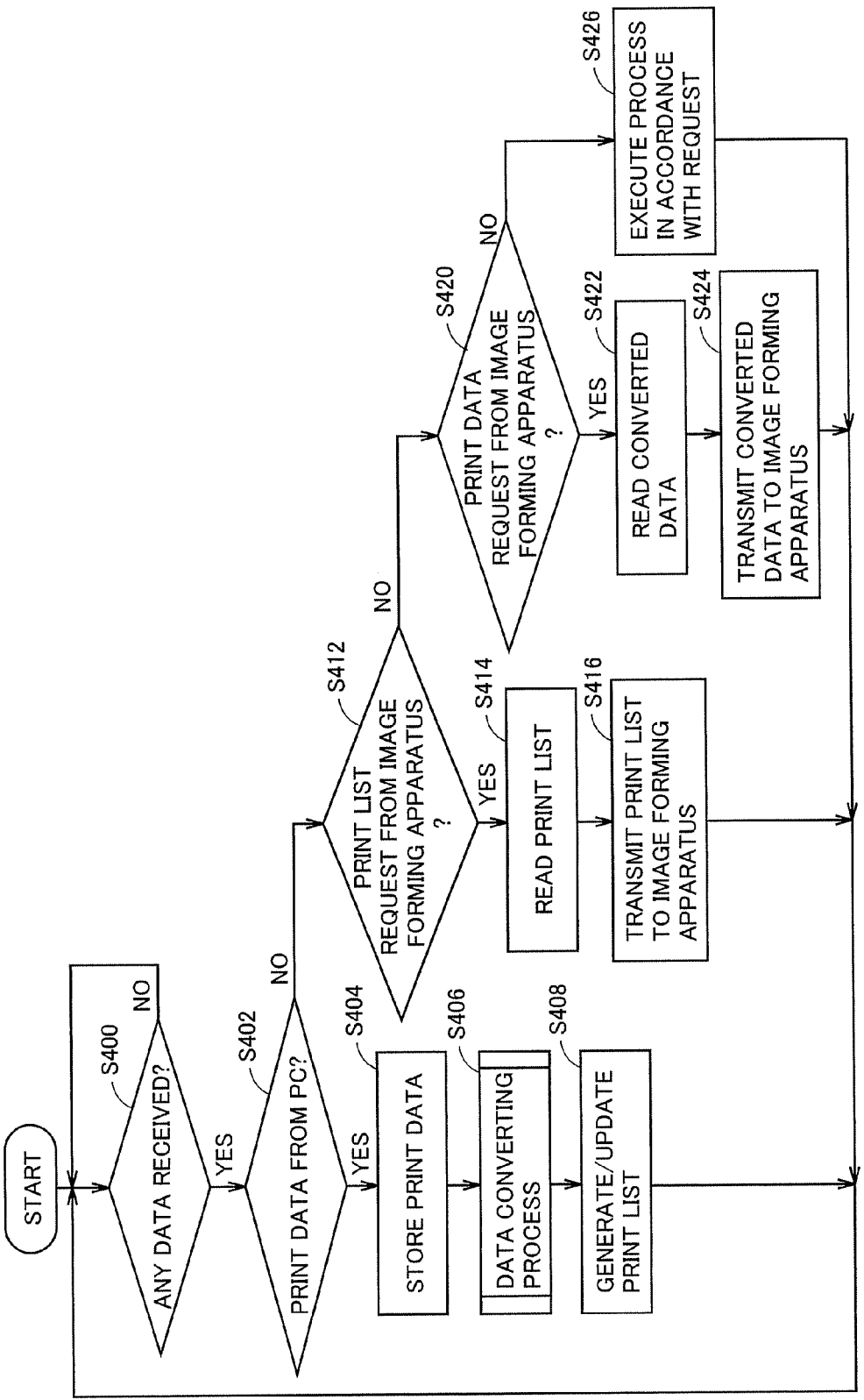
FIG. 17 is a flowchart representing process procedure in the server in accordance with the embodiment of the present invention.

FIG. 17 shows process procedure in the server SRV in accordance with the embodiment of the present invention.

Referring to FIGS. 9 and 17, first, CPU 200 functioning as print data receiving unit 400 and request receiving unit 410 determines whether any data is received through network interface unit 206 or not (step S400). If no data has been received (NO at step S400), CPU 200 waits until any data is received (step S400).

When any data is received (YES at step S400), CPU 200 determines whether the received data is print data from personal computer PC or not (step S402). If the received data is print data from the personal computer PC (YES at step S402), CPU 200 functioning as print data receiving unit 400 stores the received print data in print data storage unit 406 in hard disk unit 210 (step S404). Thereafter, CPU 200 functioning as data converting unit 420 successively generates converted data appropriate for the printing capability of each image forming apparatus MFP based on the setting information from print data receiving unit 400 and on the device information of each image forming apparatus MFP stored in advance in device information storage unit 424 (data converting process at step S406). Further, CPU 200 functioning as print list updating unit 402 newly generates or updates the print list as a list of converted data, and stores the generated or updated print list in print list storage unit 408 (step S408). Then, the process returns to step S400.

Figure 18:
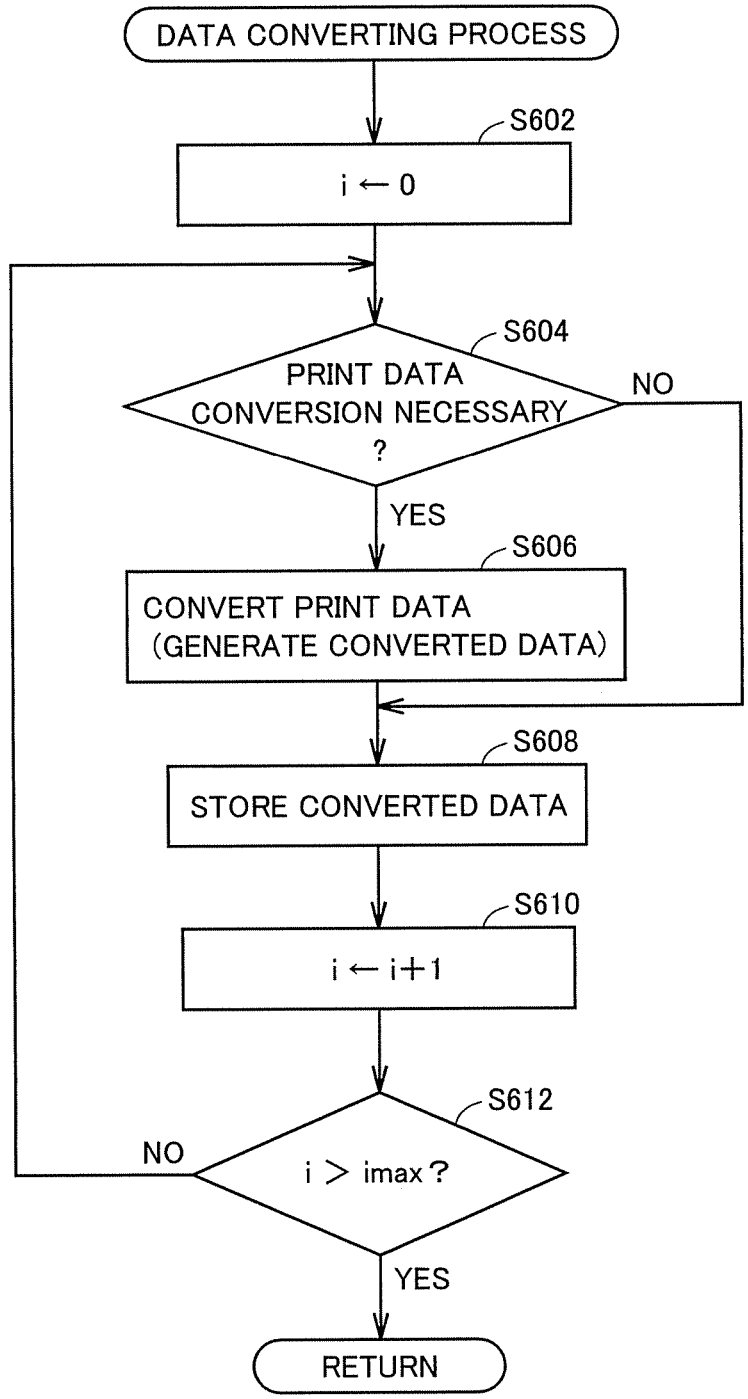
FIG. 18 is a flowchart representing data converting process procedure in the server in accordance with Embodiment 1 of the present invention.

FIG. 18 is a flowchart representing the procedure of data converting process (S406) in the server SRV in accordance with the embodiment of the present invention. As shown in FIG. 18, CPU 200 stores the received print data to print data storage unit 406 in hard disk unit 210 (S404 of FIG. 17), and starting from the image forming apparatus MFP having smaller identification ID, converts the print data to converted data appropriate for each image forming apparatus MFP. In the following, details of the data converting process (S406 of FIG. 17) will be described with reference to FIG. 18.

CPU 200 starts data converting process for the image forming apparatus MFP1 of which identification ID or an index corresponding to each image forming apparatus is the smallest (i=0) (S602). CPU 200 reads the device information of image forming apparatus MFP that corresponds to i=0, from device information storage unit 424. Then, CPU 200 determines whether all methods of printing (pieces of setting information) included in the setting information of the print data are executable or not, that is, whether data conversion of the print data is necessary or not (S604).

When data conversion of the print data is necessary (YES at S604), CPU 200 converts print data based on said device information (S606), and stores the converted data for the image forming apparatus MFP in converted data storage unit 422 (S608). Therefore, if data conversion of the print data is unnecessary (NO at S604), the print data is stored as converted data corresponding to image forming apparatus MFP1, in converted data storage unit 422 (S608).

Then, CPU 200 increments the index (S610), and proceeds to the data converting process for the image forming apparatus MFP2 having the next identification ID (i=1). If the image forming apparatus MFP that has been subjected to the process is the last one (YES at S612), CPU 200 ends the data converting process (S406 of FIG. 17), and proceeds to the print list forming process (S408 of FIG. 17).

Specifically, if the data converting process is completed on every image forming apparatus MFP (YES at S612), CPU 200 functioning as print list updating unit 402 successively stores each piece of converted data as the print list, in correspondence with the information for identifying the image forming apparatus MFP as the object, job ID of the print file and the document name, in print list storage unit 408 (step S408).

If a plurality of image forming apparatuses MFP are of the same type and same version, that is, if they have the same device information, CPU 200 may prepare only one converted data for the plurality of image forming apparatuses MFP. In other words, the plurality of image forming apparatuses MFP may share the converted data. In that case, data converting unit 420 performs the process steps S604 to S608 only for the image forming apparatus MFP that needs new converted data, and for the image forming apparatus MFP that does not need any new converted data, the index may be skipped at S610.

Again referring to FIG. 17, if the received data is not the print data from personal computer PC (NO at step S402), CPU 200 determines whether the received data is a print list request from image forming apparatus MFP or not (step S412). If the received data is a print list request from image forming apparatus MFP (YES at step S412), CPU 200 functioning as list transmitting unit 428 reads the print list of converted data from print list storage unit 408 in hard disk unit 210 (step S414). Then, CPU 200 functioning as list transmitting unit 428 transmits the read print list to image forming apparatus MFP as the source of request (step S418). Then, the process returns to step S400.

If the received data is not the print list request from image forming apparatus MFP (NO at step S412), CPU 200 determines whether the received data is a print data request from image forming apparatus MFP or not (step S420). If the received data is print data request from image forming apparatus MFP (YES at step S420), CPU 200 functioning as converted data transmitting unit 414 reads the converted data corresponding to the image forming apparatus MFP identified by the print data request, from print data storage unit 406 in hard disk unit 210 (step S422). Then, CPU 200 functioning as converted data transmitting unit 414 transmits the read converted data to the image forming apparatus MFP as the source of request (step S424). Then, the process returns to step S400.

If the received data is not the print data request from image forming apparatus MFP (NO at step S420), CPU 200 executes a process corresponding to the received request (step S426), and the process returns to step S400.

(Functional Structure and Process Procedure in Image Forming Apparatus)

Referring to FIG. 19, image forming apparatus MFP in accordance with the embodiment of the present invention includes a print list requesting unit 500, a print list receiving unit 502, a print data requesting unit 510, a print data receiving unit 512, a device information request receiving unit 520, a device information transmitting unit 522 and a device information storage unit 506, as its functions. These units except for the device information storage unit 506 are realized by CPU 100 reading a program stored in advance in ROM 102 or the like to S-RAM 104 and executing the program. Device information storage unit 506 is formed at a prescribed area of NV-RAM 106.

Print list requesting unit 500 transmits the print list request to server SRV in accordance with an operation of touch panel 136 by the user.

Print list receiving unit 502 receives the print list from server SRV and displays the received print list on display unit 138.

FIG. 20 shows an exemplary display of the print list in the image forming apparatus MFP in accordance with the embodiment of the present invention.

Referring to FIG. 20, print list receiving unit 502 (FIG. 19) has the converted data stored in server SRV displayed as a list on display unit 138, and urges the user to select the converted data. Specifically, display unit 138 displays the file name or document name of each converted data in the order of job ID, and displays a selection cursor 558 to allow the user to select print data as the object of printing. Then, the user selects the desired converted data by operating the selection cursor 558 and selects "OK" button 552, whereby selection of print data is finished. If "CANCEL" button 554 is selected, the pull print process is canceled, and subsequent printing process is not executed.

Again referring to FIG. 19, print data request unit 510 transmits, in accordance with the operation of touch panel 136 by the user as shown in FIG. 20, a print data request for specifying the selected converted data to server SRV. By way of example, the value of "job ID" is used for specifying the converted data.

Receiving the converted data from server SRV, print data receiving unit 512 has an image urging change in setting information of the received converted data displayed on display unit 138. Then, print data receiving unit 512 displays such a print setting image as shown in FIG. 7 above, before the printing process on the print data received from the server SRV. Thus, the user has a chance to change the setting information before printing.

Printer controller 118 and printing unit 116 execute the printing process based on the print data from print data receiving unit 512. Then, paper medium having the print data desired by the user printed thereon is output from the image forming apparatus MFP.

As to the correspondence between various functional blocks shown in FIG. 19 and the present invention, print list requesting unit 500 corresponds to the "list requesting unit", display unit 138 corresponds to the "display unit", print data requesting unit 510 corresponds to the "data requesting unit", and printing unit 116 corresponds to the "processing unit."

Device information request receiving unit 520 and device information transmitting unit 522 are functional configurations for successively updating the contents of device information storage unit 424 (see FIGS. 9 and 12) of the server SRV. Specifically, device information request receiving unit 520 receives the device information request from server SRV, and outputs the received device information request to device information transmitting unit 522. Device information transmitting unit 522 reads the device information stored in advance in device information storage unit 506, and transmits the read device information to server SRV.

FIG. 21 shows an example of data structure stored in device information storage unit 506 of the image forming apparatus MFP in accordance with the embodiment of the present invention.

Referring to FIG. 21, by way of example, device information storage unit 506 stores, in the form of a list, the state of functions supported by the corresponding image forming apparatuses MFP. Specifically, device information storage unit 506 stores, in correspondence with each of a plurality of functions that can be implemented in the image forming apparatus MFP, the value "Y" indicating that the function is supported or the value "N" indicating that the function is not supported. Then, in response to said device information request from the serve SRV, device information transmitting unit 522 reads the state of functions supported by the image forming apparatus MFP (printing capability) from device information storage unit 506 and transmits the same to the server SRV.

Figure 22:
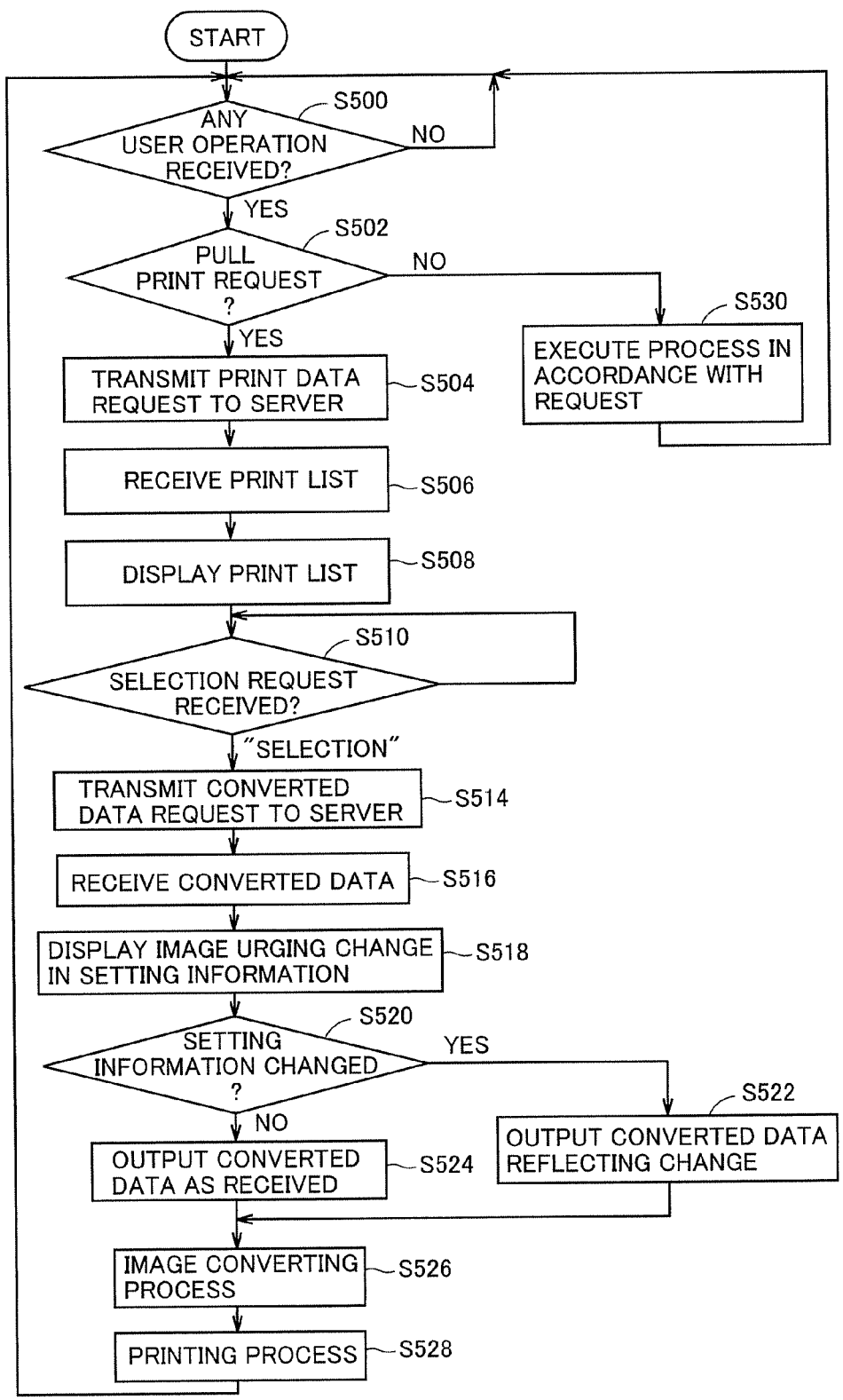
FIG. 22 is a flowchart representing process procedure in the image forming apparatus in accordance with the embodiment of the present invention.

FIG. 22 shows process procedure in the image forming apparatus MFP in accordance with the embodiment of the present invention.

Referring to FIGS. 19 and 22, first, CPU 100 determines whether any user operation through touch panel 136 has been received or not (step S500). If no user operation has been received (NO at step S500), CPU 100 waits until any user operation is received (step S500).

If any user operation is received (YES at step S500), CPU 100 determines whether the received user operation is a pull print request or not (step S502). If the received user operation is not the pull print request (NO at step S502), CPU 100 executes a process in accordance with the request (step S530). Then, the process returns to step S500.

If the received user operation is a pull print request (YES at step S502), CPU 100 functioning as print list requesting unit 500 transmits a print list request to server SRV (step S504). Thereafter, CPU 100 functioning as print list receiving unit 502 waits until the print list is received from server SRV (step S506). Receiving the print list from server SRV, CPU 100 functioning as print list receiving unit 502 has the received print list displayed on display unit 138 (step S508). Further, CPU 100 determines whether a converted data selection request from the user has been received through touch panel 136 or not (step S510). If the selection request is not received (NO at step S510), CPU waits until the selection request is received (step S510).

If a selection request from the user is received (YES at step S510), CPU 100 functioning as print data requesting unit 510 transmits a print data request for specifying the selected converted data to server SRV (step S514). Thereafter, CPU 100 functioning as print data receiving unit 512 waits until the converted data is received from server SRV (step S516).

Receiving the print data from server SRV, CPU 100 functioning as print data receiving unit 512 has an image urging change in setting information with respect to the received converted data displayed on display unit 138 (step S518). Then, CPU 100 functioning as print data receiving unit 512 determines whether the setting information of the object converted data is changed by a user operation or not (step S520). If the setting information of the object converted data is changed (YES at step S520), CPU 100 functioning as print data receiving unit 512 outputs the converted data reflecting the change to printer controller 118 (step S522). If the setting information of the object converted data is not changed (NO at step S520), CPU 100 functioning as print data receiving unit 512 outputs the converted data as received from server SRV to printer controller 118 (step S524).

Based on the converted data from CPU 100, printer controller 118 performs a prescribed image converting process, and outputs the processed data (e.g. raster data) to printing unit 116 (step S526). Based on the raster data from printer controller 118, printing unit 116 prints an image on paper medium and outputs the result (step S528). Then, the process returns to step S500.

According to the embodiment of the present invention, receiving the print data from the personal computer, the server SRV generates print data (or converted data) with setting information and data body (character code, image data and the like) included in each print data converted, for each image forming apparatus MFP, based on the device information of each image forming apparatus MFP stored in advance. In response to a list request from an image forming apparatus MFP, the list of converted data stored in the server SRV is transmitted, and in response to a data request from the image forming apparatus MFP, the converted data corresponding to each image forming apparatus selected by the image forming apparatus is transmitted. In this manner, the server SRV in accordance with the present embodiment transmits the converted print data (converted data) appropriate for the image forming apparatus to the image forming apparatus of interest, and therefore, regardless of the capability of image forming apparatus, the image forming apparatus MFP can form an image in accordance with the printing method set by the personal computer PC.

Other Embodiments

The program in accordance with the present invention may be realized by calling necessary modules in a prescribed sequence at prescribed timings to execute processes, from program modules provided as part of the operating system (OS) of a computer. In such a case, the program itself does not include the modules mentioned above, and the processes are executed in cooperation with the OS. Such program not including the modules is also encompassed by the present invention.

Further, the program in accordance with the present invention may be provided incorporated as a part of another program. In that case also, the program itself does not include the modules included in said another program, and the processes are executed in cooperation with said another program. Such a program incorporated in another program is also encompassed by the present invention.

The program product provided by the invention is executed installed in a program storage such as a hard disk. The program product includes the program itself and a storage medium storing the program.

Further, part of or all of the functions realized by the program in accordance with the present invention may be implemented by dedicated hardware.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image forming system, comprising:
at least one information processing apparatus capable of transmitting print data including setting information related to image formation;
a server receiving said print data from an information processing apparatus; and
a plurality of image forming apparatuses capable of data communication with said server; wherein
said server includes
a device information storage unit storing, in advance of receiving said print data from said information processing apparatus, device information of each image forming apparatus of said plurality of image forming apparatuses,
a print data storage unit storing said print data from said information processing apparatus,
a data converting unit converting, upon receiving said print data from said information processing apparatus and prior to a request for said print data from an image forming apparatus, said print data to converted data for each image forming apparatus of said plurality of image forming apparatuses in communication with the server based on said device information of each image forming apparatus stored in the device information storage unit,
a converted data storage unit storing said converted data of each image forming apparatus in communication with the server and information specifying its associated image forming apparatus from said plurality of image forming apparatuses, and
a converted data transmitting unit responsive to a data request from a particular image forming apparatus from the plurality of image forming apparatuses for transmitting said converted data corresponding to the particular image forming apparatus, stored in said converted data storage unit; and
each image forming apparatus includes
a data requesting unit transmitting said data request for converted data to said server in accordance with a user operation, and
a processing unit for performing an image forming process based on said converted data received from said server, wherein the converted data stored in the converted data storage unit includes at least two kinds of converted data for the plurality of image forming apparatuses, a first converted data is based on a printing method of at least one first image forming apparatus of the plurality of image forming apparatuses with a first set of printing capabilities, a second converted data is based on a printing method of at least one second image forming apparatus of the plurality of image forming apparatuses with a second set of printing capabilities, and the first set of printing capabilities is different from the second set of printing capabilities.

2. The image forming system according to claim 1, wherein said server further includes
a list generating unit generating a list of converted data corresponding to the image forming apparatus, for each said image forming apparatus, based on the converted data stored in said converted data storage unit, and a list transmitting unit responsive to a list request from said image forming apparatus, for transmitting said list corresponding to the image forming apparatus to the image forming apparatus;

said converted data transmitting unit transmits a specific converted data in response to the data request from said image forming apparatus;

each image forming apparatus of the plurality of image forming apparatuses includes a list requesting unit transmitting said list request to said server in accordance with a user operation, and a display unit displaying said list from said server; and said data requesting unit transmits said data request for specifying the converted data selected from said list to said server, in accordance with a user operation.

3. The image forming system according to claim 1, wherein said image forming apparatus is configured to selectively support a plurality of functions;

said setting information includes setting of a process that depends on any of said plurality of functions;

said device information includes state of support of said plurality of functions of said image forming apparatus; and said data converting unit converts, for each image forming apparatus from said plurality of image forming apparatuses, said print data to converted data allowing execution of image formation by each image forming apparatus, based on the function supported by each image forming apparatus, among functions necessary for executing the process included in said setting information.

4. The image forming system according to claim 1, wherein said data converting unit converts contents of said print data received from said information processing apparatus to converted contents of print data after reducing and collecting data of multiple pages, based on said device information, for each image forming apparatus incapable of printing multiple pages on one page.

5. The image forming system according to claim 1, wherein said data converting unit rearranges contents of said print data to a collated manner, based on said device information, for each image forming apparatus incapable of executing collated printing.

6. The image forming system according to claim 1, wherein said data converting unit rearranges contents of said print data in reverse order of pages, based on said device information, for each image forming apparatus discharging sheets of paper in face-up manner.

7. The image forming system according to claim 1, wherein said server further includes a deleting unit for deleting, after said converted data is transmitted to said image forming apparatus, the converted data converted from the print data that corresponds to the transmitted converted data, from said data storage unit.

8. The image forming system according to claim 1, wherein said device information is a list of functions supported by a particular image forming apparatus.

9. The image forming system according to claim 1, wherein the converted data stored in the converted data storage unit also includes a corresponding job identification number of the print file and a document name.

10. A server, connectable through a network to at least one information processing apparatus capable of transmitting print data including setting information related to image formation and a plurality of image forming apparatuses capable of data communication with said server, and further capable of receiving said print data from said image processing apparatus, said server comprising:

a device information storage unit storing, in advance of receiving said print data from said information processing apparatus, device information of each image forming apparatus of said plurality of image forming apparatuses, a print data storage unit storing said print data from said information processing apparatus, a data converting unit converting, upon receiving said print data from said information processing apparatus and prior to a request for said print data from an image forming apparatus, said print data to converted data for each image forming apparatus of said plurality of image forming apparatuses in communication with the server based on said device information of each image forming apparatus stored in the device information storage unit, a converted data storage unit storing said converted data of each image forming apparatus in communication with the server and information specifying its associated image forming apparatus, and a converted data transmitting unit responsive to a data request from a particular image forming apparatus from the plurality of image forming apparatuses for transmitting said converted data corresponding to the particular image forming apparatus, stored in said converted data storage unit, wherein the converted data stored in the converted data storage unit includes at least two kinds of converted data for the plurality of image forming apparatuses, a first converted data is based on a printing method of at least one first image forming apparatus of the plurality of image forming apparatuses with a first set of printing capabilities, a second converted data is based on a printing method of at least one second image forming apparatus of the plurality of image forming apparatuses with a second set of printing capabilities, and the first set of printing capabilities is different from the second set of printing capabilities.

11. The server according to claim 10, further comprising:

a list generating unit generating a list of converted data corresponding to the particular image forming apparatus, for each image forming apparatus, based on the converted data stored in said converted data storage unit; and a list transmitting unit responsive to a list request from said particular image forming apparatus, for transmitting said list corresponding to the particular image forming apparatus to the particular image forming apparatus; wherein said converted data transmitting unit transmits a specific converted data in response to the data request from said particular image forming apparatus.

12. A non-transitory computer readable storage medium, storing an image forming program, causing a computer connectable through a network to at least one information processing apparatus, capable of transmitting print data including setting information related to image formation, and a plurality of image forming apparatuses, receiving said print data from an image processing apparatus, to execute the steps of:

storing, in advance of receiving said print data from said information processing apparatus, device information of each image forming apparatus of said plurality of image forming apparatuses;

storing said print data from said information processing apparatus;

converting, upon said computer receiving said print data from said information processing apparatus and prior to a request for said print data from an image forming apparatus, said print data to converted data for each image forming apparatus of said plurality of image forming apparatuses in communication with the server based on said device information;

storing said converted data of each said image forming apparatus in communication with the server and information specifying its associated image forming apparatus from said plurality of image forming apparatuses; and in response to a data request from a particular image forming apparatus from the plurality of image forming apparatuses, transmitting said converted data corresponding to the particular image forming apparatus, stored in said converted data storage unit, wherein the stored converted data includes at least two kinds of converted data for the plurality of image forming apparatuses, a first converted data is based on a printing method of at least one first image forming apparatus of the plurality of image forming apparatuses with a first set of printing capabilities, a second converted data is based on a printing method of at least one second image forming apparatus of the plurality of image forming apparatuses with a second set of printing capabilities, and the first set of printing capabilities is different from the second set of printing capabilities.

13. An image forming method using an image forming system, wherein said image forming system includes at least one information processing apparatus capable of transmitting print data including setting information related to image formation, a server receiving said print data from said information processing apparatus; and a plurality of image forming apparatuses capable of data communication with said server, said server storing, in advance of receiving said print data from said information processing apparatus, device information of each of said plurality of image forming apparatuses, said image forming method comprising the steps of:

storing, in said server, said print data from said information processing apparatus;

converting, in said server, said print data to converted data, upon said server receiving said print data from said information processing apparatus and prior to a request for said print data from an image forming apparatus, for each image forming apparatus of said plurality of image forming apparatuses in communication with the server based on said device information of each image forming apparatus;

storing, in said server, said converted data of each said image forming apparatus in communication with the server in correspondence with information for specifying a corresponding image forming apparatus from said plurality of image forming apparatuses;

transmitting, from said server, the converted data corresponding to a particular image forming apparatus to the particular image forming apparatus in response to the request from said particular image forming apparatus;

transmitting, from said particular image forming apparatus from said plurality of image forming apparatuses, said data request to said server in accordance with a user operation; and performing, by said image forming apparatus, an image forming process based on said converted data in accordance with a user operation, wherein the stored converted data includes at least two kinds of converted data for the plurality of image forming apparatuses, a first converted data is based on a printing method of at least one first image forming apparatus of the plurality of image forming apparatuses with a first set of printing capabilities, a second converted data is based on a printing method of at least one second image forming apparatus of the plurality of image forming apparatuses with a second set of printing capabilities, and the first set of printing capabilities is different from the second set of printing capabilities.

14. The image forming method according to claim 13, further comprising the steps of:

generating, in said server, based on the converted data stored in said converted data storage unit, a list of converted data, each converted data in said list corresponding to an image forming apparatus of said plurality of image forming apparatus in communication with said server;

transmitting, from said server, to a particular image forming apparatus, said list corresponding to the particular image forming apparatus, in response to a list request from said particular image forming apparatus;

transmitting, from said particular image forming apparatus, said list request to said server in accordance with a user operation; and displaying, at said particular image forming apparatus, said list from said server; wherein said data request includes information specifying the converted data selected from said list, in accordance with a user operation.

* * * * *